United States Patent
Kim et al.

(10) Patent No.: US 7,391,750 B2
(45) Date of Patent: Jun. 24, 2008

(54) SYSTEM AND METHOD FOR DYNAMICALLY ALLOCATING RESOURCES IN A MOBILE COMMUNICATION SYSTEM EMPLOYING ORTHOGONAL FREQUENCY DIVISION MULTIPLE ACCESS

(75) Inventors: So-Hyun Kim, Suwon-si (KR);
Chang-Hoi Koo, Seongnam-si (KR);
Jung-Je Son, Seongnam-si (KR);
Yeong-Moon Son, Anyang-si (KR);
Sung-Jin Lee, Suwon-si (KR);
Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 823 days.

(21) Appl. No.: 10/945,457

(22) Filed: Sep. 20, 2004

(65) Prior Publication Data

US 2005/0063336 A1 Mar. 24, 2005

(30) Foreign Application Priority Data

Sep. 20, 2003 (KR) ...................... 10-2003-0065421

(51) Int. Cl.
*H04Q 7/00* (2006.01)
*H04Q 7/20* (2006.01)
*H04I 11/00* (2006.01)
*H04B 7/216* (2006.01)
*H04J 11/00* (2006.01)

(52) U.S. Cl. .................. 370/329; 370/342; 370/344; 370/480; 375/260 H

(58) Field of Classification Search ................ 370/329, 370/342, 344, 480, 343, 208, 468; 455/452.1; 375/260
See application file for complete search history.

(56) References Cited

U.S. PATENT DOCUMENTS

| | | | |
|---|---|---|---|
| 2004/0264507 A1* | 12/2004 | Cho et al. | 370/480 |
| 2005/0002369 A1* | 1/2005 | Ro et al. | 370/342 |
| 2005/0058097 A1* | 3/2005 | Kang et al. | 370/329 |
| 2005/0063336 A1* | 3/2005 | Kim et al. | 370/329 |
| 2005/0111429 A1* | 5/2005 | Kim et al. | 370/344 |
| 2005/0238108 A1* | 10/2005 | Suh et al. | 375/260 |

* cited by examiner

*Primary Examiner*—William D. Cumming
(74) *Attorney, Agent, or Firm*—The Farrell Law Firm, PC

(57) ABSTRACT

Dynamically allocating a frame cell (FC)/subchannel in a mobile communication system by an access point that receives channel quality information (CQIs) fed back from access terminals, determines a modulation and coding scheme (MCS) to be applied to the access terminals based on the CQIs, and if access terminals whose FCs/subchannels must be changed are detected from the access terminals, sends an FC/subchannel change request to an access router. The access router allocates an FC/subchannel set by selecting a number of FCs/subchannels according to the FC/subchannel change request, and transmits information on the allocated FC/subchannel set to the access point. The access point selects and allocates a particular FC/subchannel from among FCs/subchannels in the FC/subchannel set information to the access terminals whose FCs/subchannels must be changed, based on CQIs last received from the access terminals.

16 Claims, 13 Drawing Sheets

SYSTEM AND METHOD FOR DYNAMICALLY ALLOCATING RESOURCES IN A MOBILE COMMUNICATION SYSTEM EMPLOYING ORTHOGONAL FREQUENCY DIVISION MULTIPLE ACCESS

PRIORITY

This application claims priority under 35 U.S.C. § 119 to an application entitled "System and Method for Dynamically Allocating Resources in a Mobile Communication System Employing Orthogonal Frequency Division Multiple Access" filed in the Korean Intellectual Property Office on Sep. 20, 2003 and assigned Serial No. 2003-65421, the contents of which are hereby incorporated by reference.

BACKGROUND OF THE INVENTION

1. Field of the Invention

The present invention relates generally to a mobile communication system employing Orthogonal Frequency Division Multiple Access (OFDMA), and in particular, to a system and method for dynamically allocating resources according to channel states.

2. Description of the Related Art

With the introduction of the cellular mobile communication system in the U.S. in the late 1970's, South Korea began to provide a voice communication service based on an Advanced Mobile Phone Service (AMPS) system, also referred to as a first generation (1G) analog mobile communication system. In the mid 1990's, South Korea commercialized a Code Division Multiple Access (CDMA) system, that is a second generation (2G) mobile communication system, to provide voice and low-speed data services.

Since the late 1990's, South Korea has partially deployed an IMT-2000 (International Mobile Telecommunication-2000) system, also known as a third generation (3G) mobile communication system, aimed at an advanced wireless multimedia service, global roaming, and a high-speed data service. The 3G mobile communication system was especially developed to transmit data at high rate to accommodate the rapid increase in the amount of data serviced therein.

Currently, the 3G mobile communication system is evolving into a fourth generation (4G) mobile communication system. In the 4G mobile communication system, referred to as a next generation communication system, active research is being conducted on technology for providing users with services guaranteeing various qualities of service (QoSs) at a data rate of about 100 Mbps. The current 3G mobile communication system generally supports a data rate of about 384 Kbps in an outdoor channel environment having a relatively poor channel environment, and supports a data rate of a maximum of 2 Mbps in an indoor channel environment having a relatively good channel environment.

A wireless local area network (LAN) system and a wireless metropolitan area network (MAN) system generally support a data rate of 20 to 50 Mbps. In the current 4G communication system, active research is being carried out on a new communication system that can provide for the mobility of a terminal and maintain a QoS for the wireless LAN system and the wireless MAN system supporting a relatively high data rate in order to support a high-speed service that the 4G communication system aims to provide.

When broadband spectrum resources are used to provide the high-speed data, for example a wireless multimedia service, intersymbol interference (ISI) occurs due to the multipath propagation. The intersymbol interference reduces the entire transmission efficiency of the system. Orthogonal Frequency Division Multiplexing (OFDM) has been proposed to resolve the intersymbol interference problem caused by the multipath propagation. OFDM is a technique for dividing the entire frequency band into a plurality of subcarriers before transmission. The use of OFDM increases one symbol duration, thereby minimizing the intersymbol interference.

OFDM, a modulation technique for transmitting data using multiple carriers, is a special case of the MCM (Multi-Carrier Modulation) technique in which an input serial symbol stream is converted into parallel symbol streams and then the parallel symbol streams are modulated into multiple orthogonal subcarriers before being transmitted. The first MCM systems appeared in the late 1950's for use in military high frequency (HF) radio communication systems, and the OFDM with overlapping orthogonal subcarriers was initially developed in the 1970's. In view of orthogonal modulation between multiple carriers, OFDM has limitations in actual implementation for systems. In 1971, Weinstein, et al. proved that OFDM modulation/demodulation can be efficiently processed using Discrete Fourier Transform (DFT), which was a driving force behind the development of OFDM. Also, with the introduction of a guard interval and a cyclic prefix as the guard interval further mitigates the adverse effects multipath propagation and delay spread have on systems. That's why OFDM has widely been exploited for digital transmission technologies such as digital audio broadcasting (DAB), digital TV broadcasting, wireless local area network (WLAN), and the wireless asynchronous transfer mode (WATM). Although the hardware complexity was an obstacle in the implementation of the OFDM, recent advances in digital signal processing technology including Fast Fourier Transform (FFT) and Inverse Fast Fourier Transform (IFFT) enable OFDM to be implemented.

OFDM, although being similar to the conventional Frequency Division Multiplexing (FDM), is distinguished therefrom in that the OFDM can secure optimal transmission efficiency during a high-speed data transmission by maintaining orthogonality between the subcarriers. In addition, OFDM is characterized in that it has a high frequency efficiency and is not significantly effected by multipath fading, thereby securing optimal transmission efficiency during high-speed data transmissions. Further, because OFDM uses overlapping frequency spectrums, it has high frequency efficiency, is not significantly effected by frequency selective fading and multipath fading, reduces intersymbol interference (ISI) using a guard interval, enables the design of an equalizer with a simple hardware structure, and is not significantly effected by impulse noises. Based on these advantages, OFDM is being actively applied to communication systems.

Orthogonal Frequency Division Multiple Access (OFDMA), OFDM-based Multiple Access, reconfigures some of the subcarriers from among all of the subcarriers as a subcarrier set, and allocates the subcarrier set to a particular access terminal (AT). OFDMA supports Dynamic Resource Allocation (DRA) capable of dynamically allocating a subcarrier set to a particular access terminal according to a fading characteristic of a wireless transmission line.

FIG. 1 is a diagram illustrating a configuration of a mobile communication system employing OFDMA ("OFMDA mobile communication system"). Referring to FIG. 1, the OFDMA mobile communication system, having a multi-cell configuration, i.e. having a cell 100 and a cell 150, includes an access point (AP) 110 for managing cell 100, an access point 160 for managing cell 150, an access router (AR) 120 for controlling the access points 110 and 160, access terminals (ATs) 111 and 113 for receiving a service provided from the access point 110, access terminals 161 and 163 for receiving a service provided from the access point 160, and an access terminal 131 that is in the process of being handed over to the access point 160 while receiving a service provided from the access point 110. It should be noted herein that the access router serves as a base station controller (BSC), and the access points serve as base stations (BSs). Signal transmission/reception between the access points 110 and 160 and the access terminals 111, 113, 131, 161 and 163 is achieved using OFMDA.

In order to increase channel efficiency between an access point and access terminals located in the same cell, resources must be shared. In the OFDMA mobile communication system, the subcarriers are the typical resources that can be shared by a plurality of access terminals, and the subcarriers are grouped into subcarrier sets. The entire transmission efficiency of the OFDMA mobile communication system is based on the allocation of the subcarriers to the access terminals located in the cell. That is, scheduling for the subcarrier allocation is always an important factor for improving the performance of the OFDMA mobile communication system. However, because the allocation of the subcarriers is determined according to the channel states, research is currently being conducted to devise a scheme for allocating subcarriers by accurately measuring a state of an allocated channel.

A description will now be made of a scheduling technique, or a technique for allocating the subcarriers.

Typically, the technique for allocating subcarriers is classified into a Static Channel Allocation (SCA) and a Dynamic Channel Allocation (DCA). SCA includes a Static Subcarrier Assignment (SSA), a Pseudo Static Assignment (PSA), and a Simple Rotating Subcarrier Space Assignment (Simple RSSA). DCA also typically includes a Fast Dynamic Channel Allocation (Fast DCA).

a. SSA

SSA, the simplest subcarrier allocation technique, allocates a fixed and predetermined number of subcarriers to each of the access terminals. That is, SSA allocates to a particular access terminal a fixed and predetermined number of subcarriers from among all of the subcarriers for the OFDMA mobile communication system regardless the channel states. Because SSA allocates the same number of subcarriers to all access terminals, it guarantees a fairness of the channel allocation but cannot guarantee channel the quality of the subcarriers allocated to the access terminals.

b. PSA

PSA mutually exchanges, between access terminals, the fixed and predetermined number of the subcarriers allocated to the access terminals, and reallocates the exchanged subcarriers. That is, PSA, although it allocates the same number of subcarriers to all access terminals, can prevent deterioration in the channel quality of the access terminals by exchanging the allocated subcarriers between the access terminals. PSA allocates subcarriers having a relatively higher channel quality to the access terminals, thereby increasing the entire transmission efficiency of the OFDMA mobile communication system.

c. Simple RSSA

Simple RSSA, a technique similar to PSA, allocates the same number, or the predetermined number of subcarriers, to all of the access terminals. However, Simple RSSA, unlike PSA, allocates subcarriers having higher channel quality to access terminals having higher priority, for example by taking into consideration a QoS level. Although Simple RSSA can guarantee fairness in terms of the number of allocated subcarriers, it cannot guarantee a fairness related to the channel allocation because it allocates channels to access terminals by considering the QoS level.

d. Fast DCA

Fast DCA minimizes intracell interference or intercell interference, and allocates subcarriers having the best channel quality to access terminals by taking into consideration the channel quality itself. That is, Fast DCA dynamically allocates subcarriers to access terminals according to the channel quality, thereby maximizing transmission efficiency of the OFDMA mobile communication system.

Also, active research is being conducted to devise a scheme for efficiently allocating sets of subcarriers, i.e. subchannels, to access terminals by taking into consideration the OFDMA characteristic so as to maximize user diversity. In the proposed scheme to efficiently allocate the subchannels to the access terminals, the use of channel quality information (CQI) being fed back to apply an Adaptive Modulation and Coding (AMC) to the access terminals is not restricted only to a physical layer but is extended to a medium access control (MAC) layer. In other words, the scheme for efficiently allocating the subchannels to the access terminals applies AMC based on CQI fed back from an access terminal, i.e. allocates a Modulation and Coding Scheme (MCS) level to a corresponding access terminal in the physical layer, and dynamically allocates subchannels using the CQI in the MAC layer. Therefore, in order to maximize the transmission efficiency of the OFDMA mobile communication system, a scheme for determining in which layer to apply the AMC and DCA must also be taken into consideration.

FIG. 2 is a diagram illustrating a timing relation in the case where AMC and DCA are applied according to a decision made by an access point in a general OFDM mobile communication system. Referring to FIG. 2, an access terminal 200 transmits CQI to its access point 220 for a predetermined CQI transmission period 204 (in step 202). One example of the CQI is a signal-to-noise ratio (SNR). The access point 220 applies AMC and DCA to the access terminal 200 based on the CQI transmitted from the access terminal 200. The access point 220 determines an MCS level to be applied to the access terminal 200 and allocates a subchannel to the access terminal 200 based on CQI transmitted from the access terminal 200 (in step 222). In this case, the access point 220 selects the best subchannel for the access terminal 200 to use from among the idle subchannels based on the CQI transmitted from the access terminal 200. Although not illustrated in FIG. 2, the access point 220 transmits information on the allocated MCS level and the subchannel to the access terminal 200. Then the access terminal 200 communicates with the access point 220 through the allocated subchannel according to the MCS level.

In the case where AMC and DCA are applied according to a decision made by the access point 220 as described above, and because the access point 220 allocates an MCS level and a subchannel to be used by the access terminal 200, a backhaul delay time required in a network can be minimized and an MCS level and a subchannel can be correctly allocated by taking into consideration the channel state of the access terminal 200.

However, as illustrated in FIG. 2, when the access terminal 200 performs a handover, the access point 220 must transmit to an access router 240 the information required to perform the handover of the access terminal 200 (in step 224). The access router 240 performs the handover process such that the access terminal 200 can be handed over from the access point 220 to another access point (not shown), based on the handover process information for the access terminal 200, transmitted from the access point 220 (in step 244), and transmits to the access point 220 the handover process information based on the handover process (in step 226). Then the access point 220 performs a handover-related procedure for the access terminal 200 using the handover process information transmitted from the access router 240 (in step 230).

In case of the handover, because the access point 220 performs the handover procedure for the access terminal 200 not by itself but in cooperation with the access router 240, a delay time occurs. The delay time includes a transmission time 242 required to transmit the handover process information from the access point 220 to the access router 240, and a transmission time 228 required to transmit the handover process information to the access point 220. A delay time corresponding to the time required for the handover process to occur, and the occurrence of the delay time, obstructs the fast handover process of the access terminal 200. When the access point 220 transmits a packet to the access router 240 to perform the handover, in some cases, a transmission overlap occurs between the packets during the handover process. Because packets are occasionally lost, in the case where DCA and AMC are applied according to a decision made by the access point 220 as illustrated in FIG. 2, the transmission packets must include their unique serial numbers before being transmitted. Undesirably, however, the transmission of the serial numbers causes a reduction in transmission efficiency.

A process of applying AMC and DCA according to a decision made by an access point in an FODM mobile communication system has been described so far with reference to FIG. 2. Next, with reference to FIG. 3, a description will be made of a process of applying AMC and DCA according to a decision made by an access router in an OFMD mobile communication system.

FIG. 3 is a diagram illustrating a timing relation in the case where AMC and DCA are applied according to a decision made by an access router in a general OFDM mobile communication system. Referring to FIG. 3, an access terminal 300 transmits CQI to its access point 320 during a predetermined CQI transmission period 304 (in step 302). One example of the CQI is an SNR. The access point 320 transmits to an access router 340 the CQI received from the access terminal 300 (in step 322). Then the access router 340 applies AMC and DCA to the access terminal 300 for an access router's processing time 344 and a scheduling time 346 based on the CQI from the access terminal 300 transmitted from the access point 320. That is, the access router 340 allocates an MCS level and a subchannel to be applied to the access terminal 300 based on the CQI received from the access terminal 300.

In the case where AMC and DCA are applied according to a decision made by the access router 340 as described in connection with FIG. 3, a back-haul delay time in a network occurs. The back-haul delay time includes a CQI transmission time 342 from the access point 320 to the access router 340 and a transmission time 306 required when information on the MCS level and the subchannel allocated by the access router 340 is transmitted to the access point 320. As stated above, the back-haul delay time in a network does not take into consideration the CQI from the access terminal 300 on a real-time basis, i.e. does not correctly consider a channel state of the access terminal 300, thereby reducing reliability on MCS level and subchannel allocation by the access router 340.

SUMMARY OF THE INVENTION

It is, therefore, an object of the present invention to provide a system and method for dynamically allocating resources by taking into consideration channel states in an OFMDA mobile communication system.

It is another object of the present invention to provide a system and method for dynamically allocating resources by taking into consideration channel states and a quality-of-service (QoS) in an OFDMA mobile communication system.

It is further another object of the present invention to provide a system and method for dynamically allocating resources by taking into consideration channel states, a QoS, and a minimum bandwidth for maintaining the QoS in an OFDMA mobile communication system.

According to one aspect of the present invention, there is provided a method for dynamically allocating a frame cell (FC)/subchannel in a mobile communication system which divides an entire frequency band into a plurality of sub-frequency bands and includes a plurality of FCs having a frequency domain and a time domain, occupied by a plurality of subchannels each of which is a set of a number of sub-frequency bands. In the method, an . . . access point receives on an FC-by-FC basis channel quality information (CQIs) fed back from a plurality of access terminals, determines a modulation and coding scheme (MCS) to be applied to each of the access terminals based on the CQIs, and if FCs/subchannels currently in use by at least one access terminal must be reallocated, the access point sends to an access router an FC/subchannel reallocation request for the at least one access terminal. The access router allocates an FC/subchannel set by selecting a number of FCs/subchannels for the access terminals corresponding to the received FC/subchannel reallocation request, and transmits information related to the allocated FC/subchannel set to the access point. The access point selects and allocates particular FC/subchannel from among the FCs/subchannels in the FC/subchannel set information received from the access router for the access terminals whose FCs/subchannels must be reallocated, based on CQIs last received from the access terminals whose FCs/subchannels must be reallocated.

According another aspect of the present invention, there is provided a system for dynamically allocating a frame cell (FC)/subchannel in a mobile communication system which divides an entire frequency band into a plurality of sub-frequency bands and includes a plurality of FCs having a frequency domain and a time domain, occupied by a plurality of subchannels each of which is a set of a number of sub-frequency bands. In the system, an access point receives on an FC-by-FC basis channel quality information (CQIs) fed back from a plurality of access terminals, determines a modulation and coding scheme (MCS) to be applied to each of the access terminals based on the CQIs, sends to an access router an FC/subchannel reallocation request if FCs/subchannels must be reallocated in at least one access terminal, and if information related to an FC/subchannel set that includes a number of FCs/subchannels, generated according to a control signal of the access router in response to the FC/subchannel reallocation request, selects and allocates particular FC/subchannel from among the FCs/subchannels in the FC/subchannel set information for access terminals whose FCs/subchannels must be reallocated, based on the CQIs last received from the access terminals whose FCs/subchannels must be reallocated. The access router allocates an FC/subchannel set by selecting a number of FCs/subchannels corresponding to the FC/subchannel change request received from the access point, and transmits information on the allocated FC/subchannel set to the access point.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
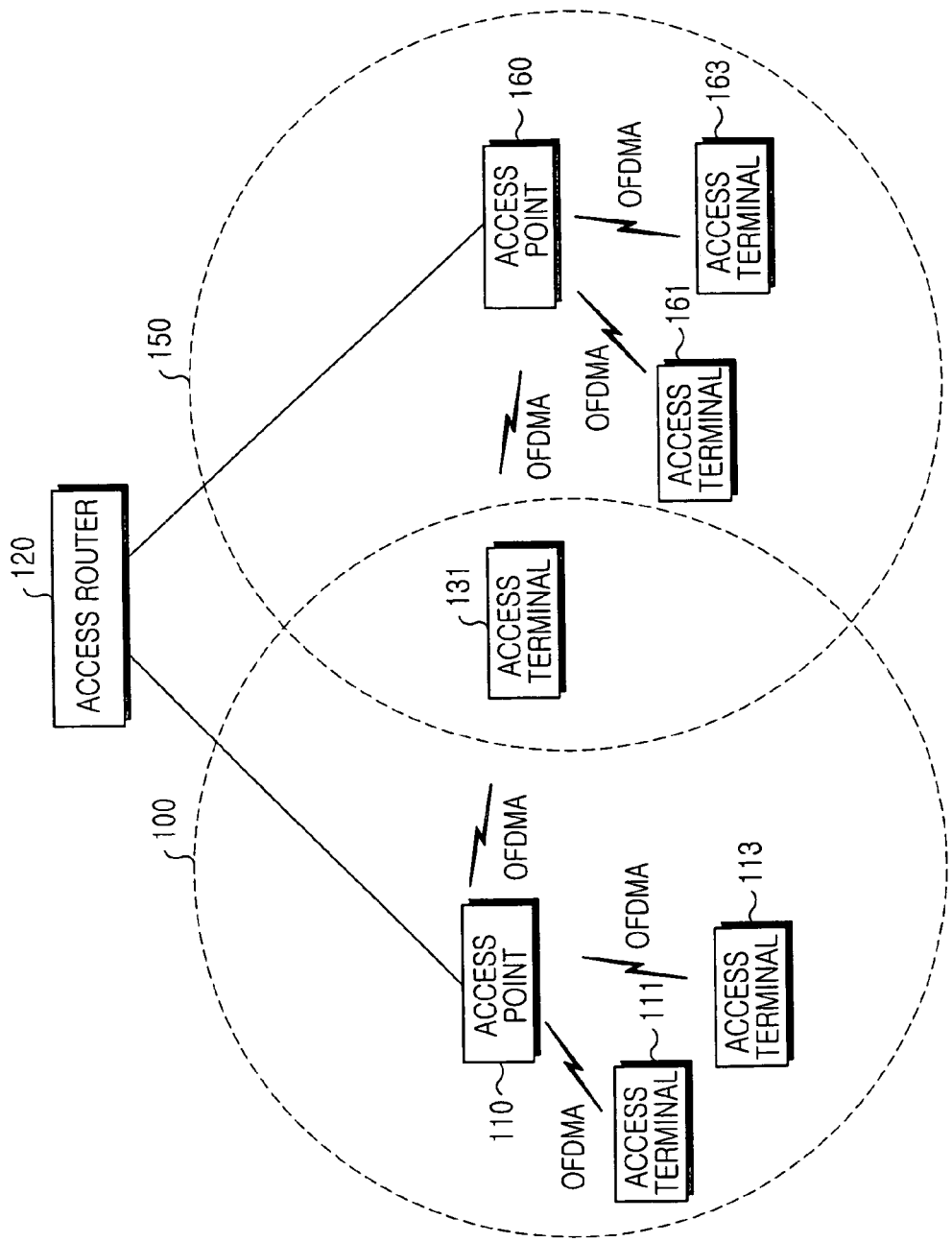
FIG. 1 is a diagram illustrating a configuration of a general OFMDA mobile communication system.
Figure 2:
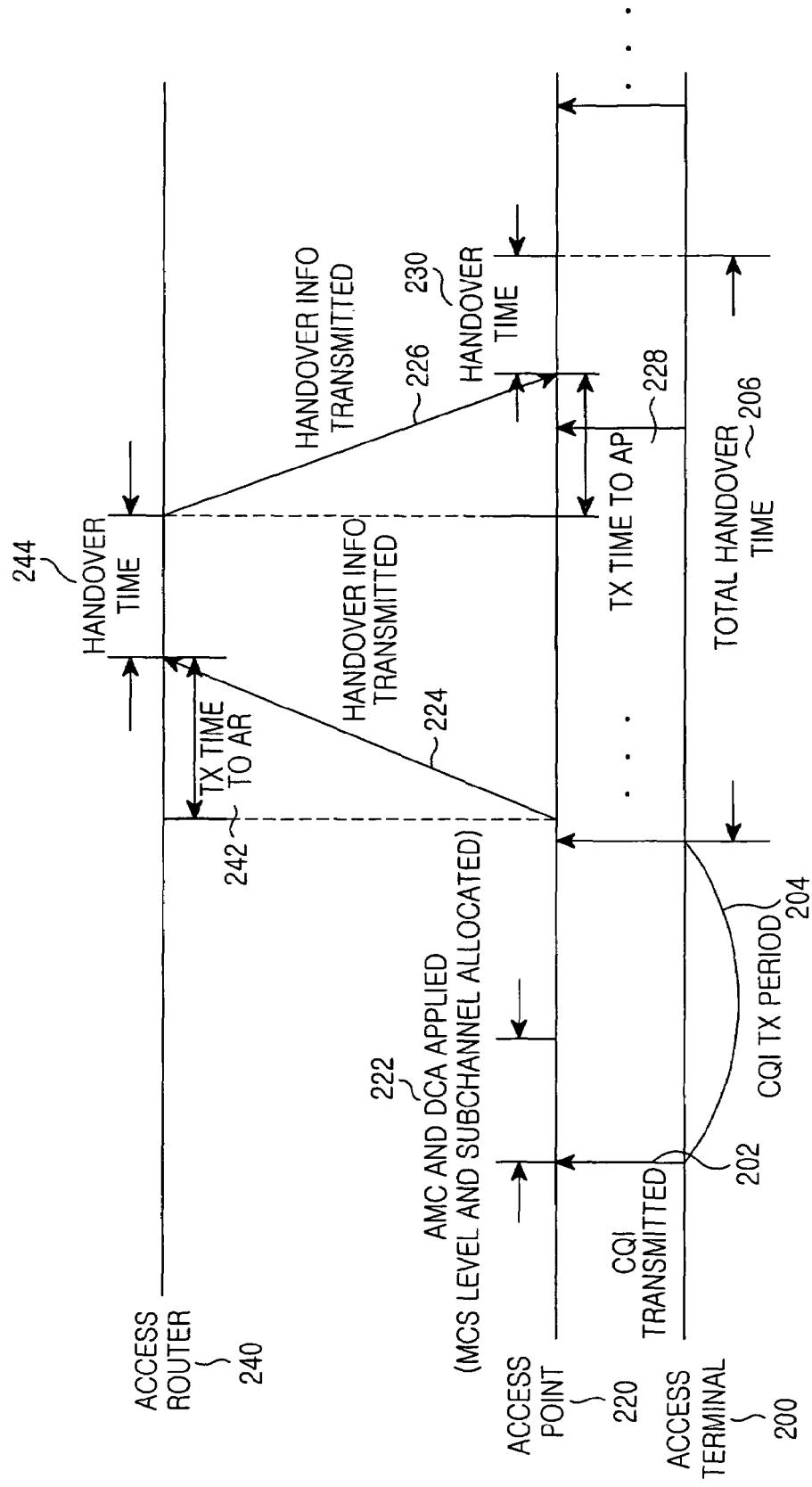
FIG. 2 is a diagram illustrating a timing relation in the case where AMC and DCA are applied according to a decision made by an access point in a general OFDM mobile communication system.
Figure 3:
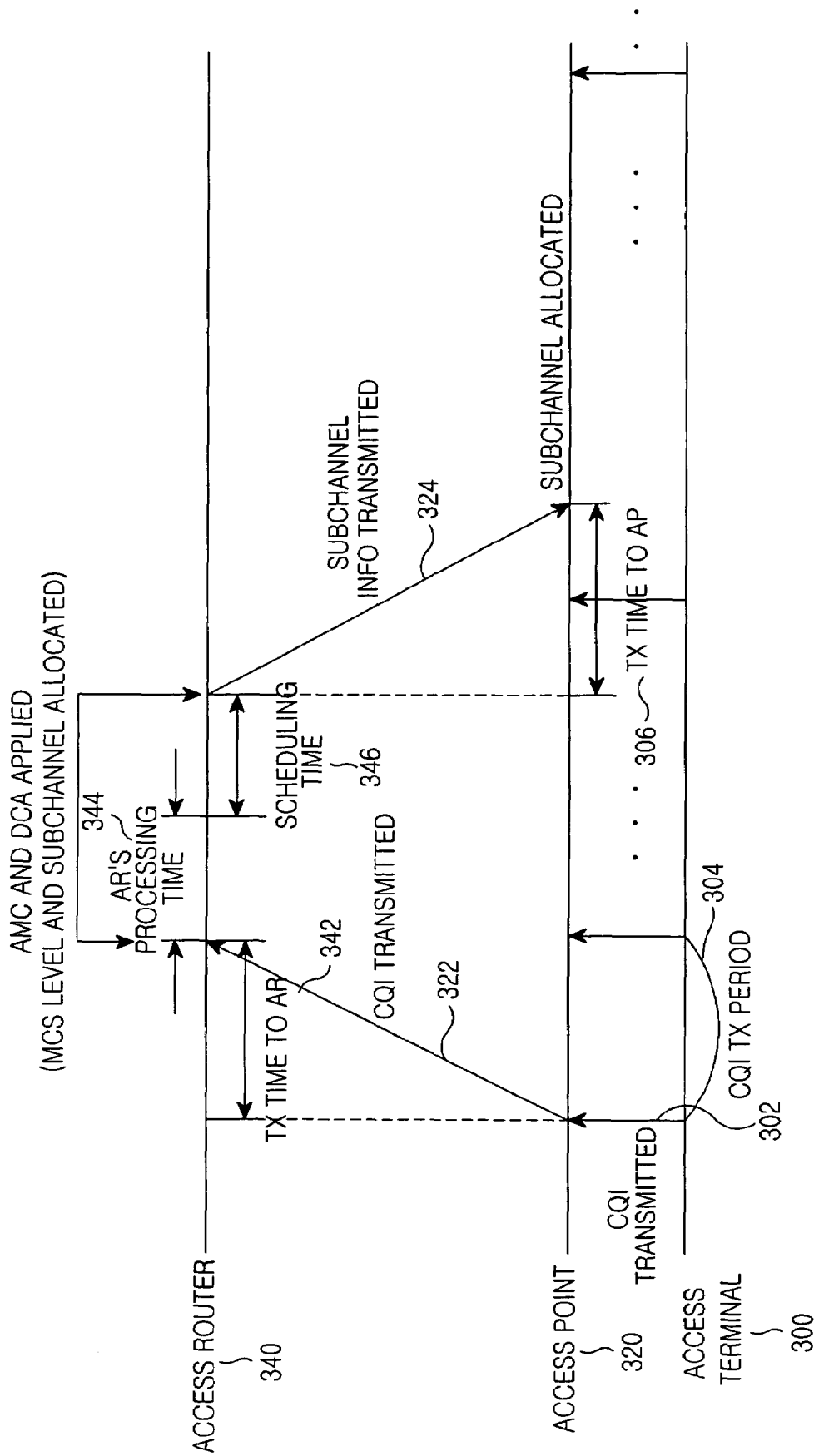
FIG. 3 is a diagram illustrating a timing relation in the case where AMC and DCA are applied according to a decision made by an access router in a general OFDM mobile communication system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 4:
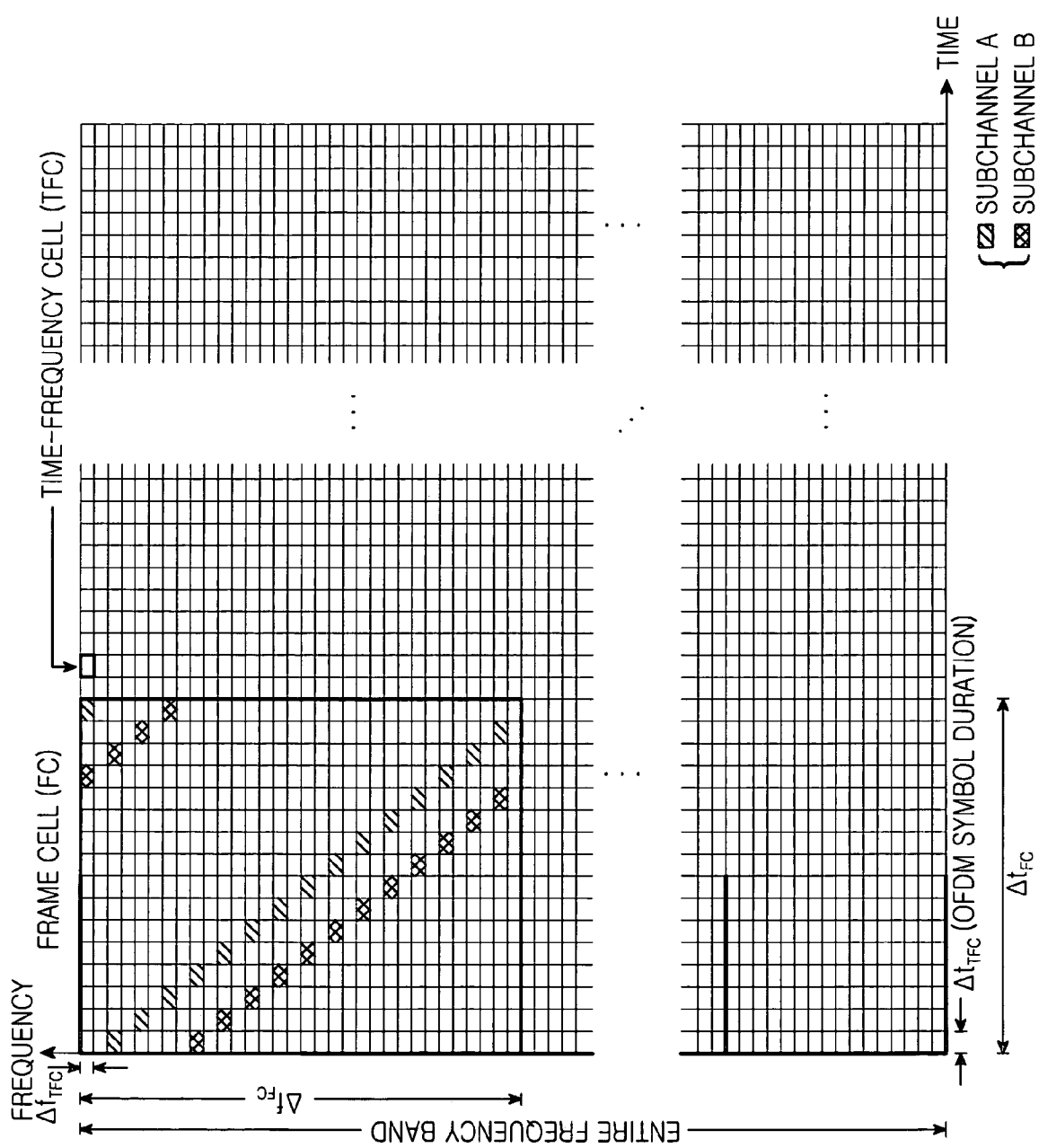
FIG. 4 is a diagram illustrating a method for allocating time-frequency resources in an FH-OFCDMA communication system.

FIG. 4 is a diagram illustrating a method for allocating time-frequency resources in a communication system employing Frequency Hopping-Orthogonal Frequency Code Division Multiple Access (FH-OFCDMA) scheme. Before a description of FIG. 4, it should be noted that Orthogonal Frequency Division Multiplexing (OFDM) scheme has a high spectrum efficiency because spectrums between subcarriers overlap each other while maintaining mutual orthogonality. OFDM scheme uses Inverse Fast Fourier Transform (IFFT) for modulation and Fast Fourier Transform (FFT) for demodulation. As implementation of OFDM-based Multiple Access, there is Orthogonal Frequency Division Multiple Access (OFDMA) scheme in which some of the subcarriers from among all of the subcarriers are allocated to a particular access terminal (AT). The OFMDA scheme does not need spreading sequences, and can dynamically change or reallocate a set of subcarriers allocated to a particular access terminal according to a fading characteristic of a wireless transmission channel. A scheme for dynamically reallocating a set of subcarriers allocated to a particular access terminal is referred to as "Dynamic Resource Allocation (DRA)," and Frequency Hopping (FH) scheme is a typical example of DRA.

Multiple Access scheme that needs spreading sequences is classified into Spreading-in-Time Domain and Spreading-in-Frequency Domain. The spreading-in-Time Domain is a technique for spreading an access terminal signal, or a user signal, in the time domain, and then mapping the spread signal to the subcarriers. The spreading-in-Frequency Domain is a technique for demultiplexing a user signal in the time domain, mapping the demultiplexed signal to the subcarriers, and distinguishing the user signal in the frequency domain using an orthogonal sequence. FH-OFCDMA scheme is characterized in that it is not significantly effected by frequency selective fading through the CDMA scheme and FH scheme characteristics in addition to the characteristic of OFDM scheme-based Multiple Access.

Referring to FIG. 4, a unit rectangle is comprised of a predetermined number of subcarriers, and is defined as a time-frequency cell (TFC) having the same duration as an OFDM symbol interval $\Delta t_{TFC}$. A plurality of subcarriers is allocated to the TFC. In a communication system employing FH-OFCDMA ("FH-OFCDMA communication system") scheme, data corresponding to the subcarriers allocated to the TFC is processed by CDMA techniques, and thereafter, processed by OFDM scheme using the subcarriers. The CDMA scheme-based processing includes spreading data by a unique channelization code individually allocated to a subcarrier, and then scrambling the spread data by a predetermined scrambling code. In FIG. 4, a frame cell (FC) is defined in the time-frequency domain as having a bandwidth $\Delta f_{FC}$ corresponding to a predetermined multiple (for example, 32 times) of the $\Delta f_{TFC}$ and a frame duration $\Delta t_{FC}$ corresponding to a predetermined multiple (for example, 16 times) of the $\Delta t_{TFC}$. The FH-OFCDMA communication system uses the FCs in order to prevent a measurement result on a wireless transmission line, i.e. channel quality information (CQI), from being frequently reported when Adaptive Modulation and Coding (AMC) scheme is applied.

In FIG. 4, two different subchannels of a subchannel A and a subchannel B are illustrated in one FC. Here, the "subchannel" refers to a channel where a predetermined number of TFCs frequency-hop with the passage of time according to a frequency hopping pattern, before being transmitted. The number of TFCs constituting the subchannel and the frequency hopping pattern can be variably set according to system characteristics, and it will be assumed in FIG. 4 that 16 TFCs constitute one subchannel. The two different subchannels can be allocated to either different access terminals or the same access terminal. The subchannels hop at predetermined frequency intervals with the passage of time. A subchannel that is individually allocated to each access terminal is dynamically changed or reallocated according to a fading characteristic that varies with the passage of time. Although one fixed frequency hopping pattern is illustrated in FIG. 4, the frequency hopping pattern is variable.

If AMC is used, the access terminal measures the state of a wireless transmission channel at predetermined periods and reports the measurement result to an access point (AP). In response, the access point adjusts the modulation and coding schemes based on the wireless transmission channel's state information reported from the access terminal, and notifies the access terminal of the adjusted modulation and coding schemes. Thereafter, the access terminal transmits signals according to the modulation and coding schemes adjusted by the access point. In the FH-OFCDMA communication system, a report on the wireless transmission channel's state information is made on an FC-by-FC basis, thereby reducing a signaling load occurring due to the application of AMC scheme. Of course, the FC can be adjusted according to the amount of overhead information generated due to the application of the AMC scheme. For example, the FC can be widened for a large amount of overhead information, and narrowed for a small amount of overhead information.

The FH-OFCDMA communication system has been described so far with reference to FIG. 4. Next, with reference to FIG. 5, a description will be made of a process of applying AMC and DCA (Dynamic Channel Allocation) according to an embodiment of the present invention.

Figure 5:
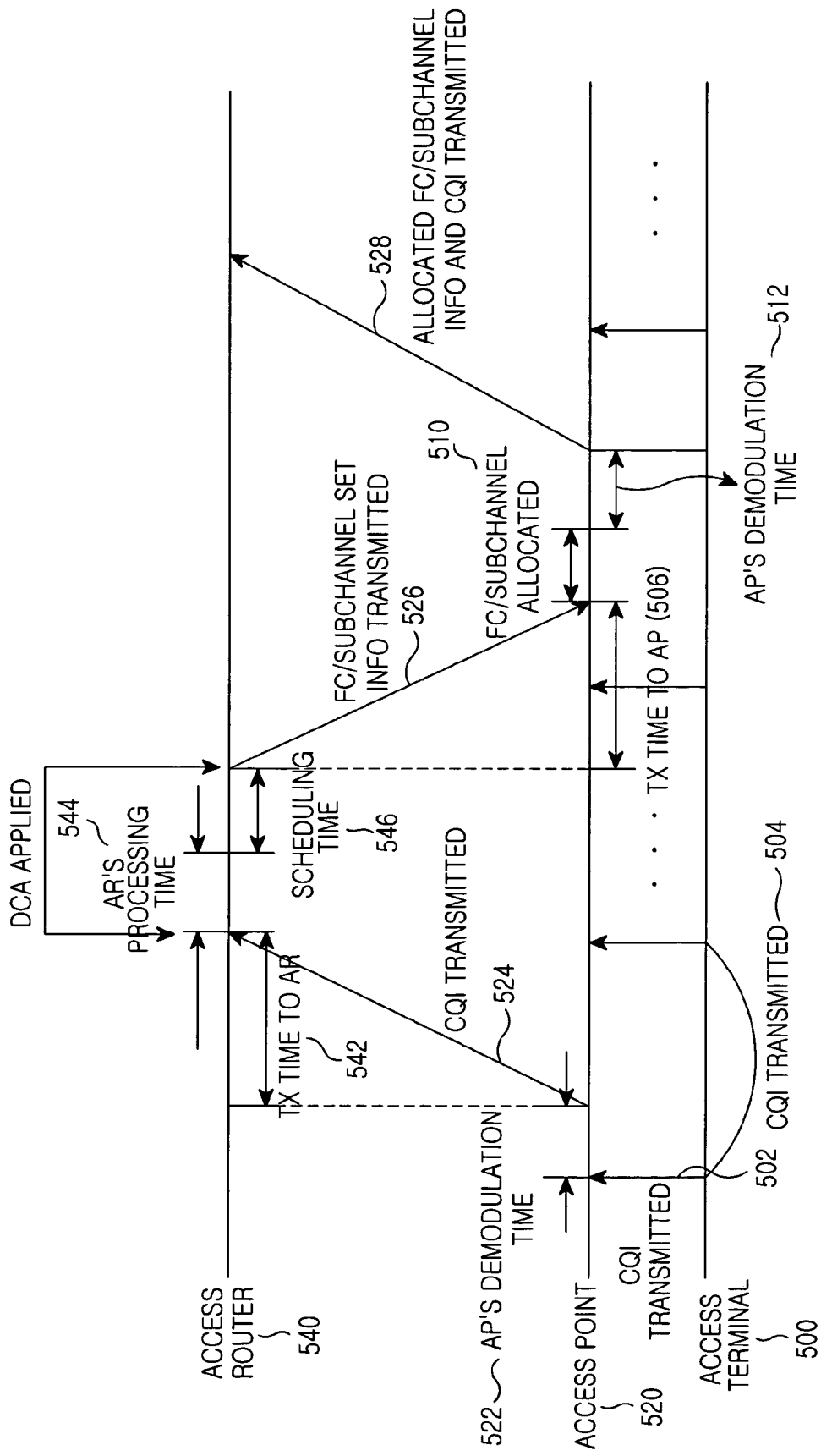
FIG. 5 is a diagram illustrating a timing relation in the case where AMC and DCA are applied in an FH-OFCDMA communication system according to an embodiment of the present invention.

FIG. 5 is a diagram illustrating a timing relation in the case where AMC scheme and DCA scheme are applied in an FH-OFCDMA communication system according to an embodiment of the present invention. Referring to FIG. 5, an access terminal 500 repeatedly transmits CQI to its access point 520 thereof at a predetermined time interval, that is, CQI transmission period 504 (in step 502). Herein, the CQI can be, for example, a signal-to-noise ratio (SNR). The access terminal 500 transmits the CQI on an FC-by-FC basis to minimize a signaling load and interference caused by the CQI transmission as described in connection with FIG. 4. The access point 520 applies AMC based on the FC-based CQIs transmitted from the access terminal 500 and stores the AMC application result. That is, the access point 520 determines an MCS (Modulation and Coding Scheme) level for each of the FCs based on the FC-based CQIs transmitted from the access terminal 500, and stores the determined MCS levels for the FCs.

The access point 520 transmits the CQI for the FCs to an access router (AR) 540 after storing the determined MCS levels for the FCs (in step 524). Here, a time required to transmit to the access router the CQIs for the FCs from the access point 520 to access router 540 is defined as a transmission time 542. The access router 540 applies DCA to the access terminal 500 based on the CQIs for the FCs transmitted from the access point 520 for an access router's processing time 544 and a scheduling time 546. That is, the access router 540 sequentially orders (or arranges) the FCs based on the channel state of the CQIs for the FCs from the access terminal 500. In the present invention, the channel states are divided into a 'good' channel state, a 'normal' channel state, and a 'bad' channel state. A channel state for each FC is defined as one of the three channel states.

The access router 540 sequentially orders the FCs from a good FC to a bad FC based on CQIs for the FCs from the access terminal 500. Thereafter, the access router 540 selects a number of best FCs and subchannels for the channel state of the access terminal 500. Herein, the number of selected FCs and subchannels will be referred to as a "FC/subchannel set." Further, it will be assumed that all of the subchannels in one FC have the same CQI, and in order to allocate a subchannel, because an FC that includes the subchannel to be allocated must be allocated together, it is simply stated that the FC and subchannel are allocated. The access router 540 transmits to the access point 520 information related to an FC/subchannel set allocated to the access terminal 500 (in step 526). Because the FH-OFCDMA communication system must take into consideration a plurality of access terminals, the access router 540 not only allocates an FC/subchannel set to the access terminal 500 according to channel states as described above, but also allocates the FC/subchannel set by also taking into consideration a relation with other access terminals receiving the same service as the access terminal 500 from the same access point 520. An operation of allocating an FC/subchannel set to access terminals by the access router 540 will be described below.

Information related to the FC/subchannel set for the access terminal 500 allocated by the access router 540 that even takes into consideration an FC/subchannel set for other access terminals, is sent to the access point 520, and the access point 520 compares CQIs for FCs in the FC/subchannel set received from the access router 540 with CQIs for the corresponding FCs last received from the access terminal 500. The access point 520 allocates to the access terminal 500 an FC and a subchannel having the best CQI from among the last received CQIs from among FCs in the FC/subchannel set as a result of the comparison (in step 510). Thereafter, the access point 520 transmits to the access router 540 the FC-based CQIs received from the access terminal 500 and information on the allocated FC and subchannel (in step 528).

A timing relation in the case where AMC and DCA are applied in an FH-OFCDMA communication system has been described so far with reference to FIG. 5. Next, with reference to FIG. 6, a description will be made of a dynamic channel allocation process in an FH-OFCDMA communication system according to an embodiment of the present invention.

Figure 6:
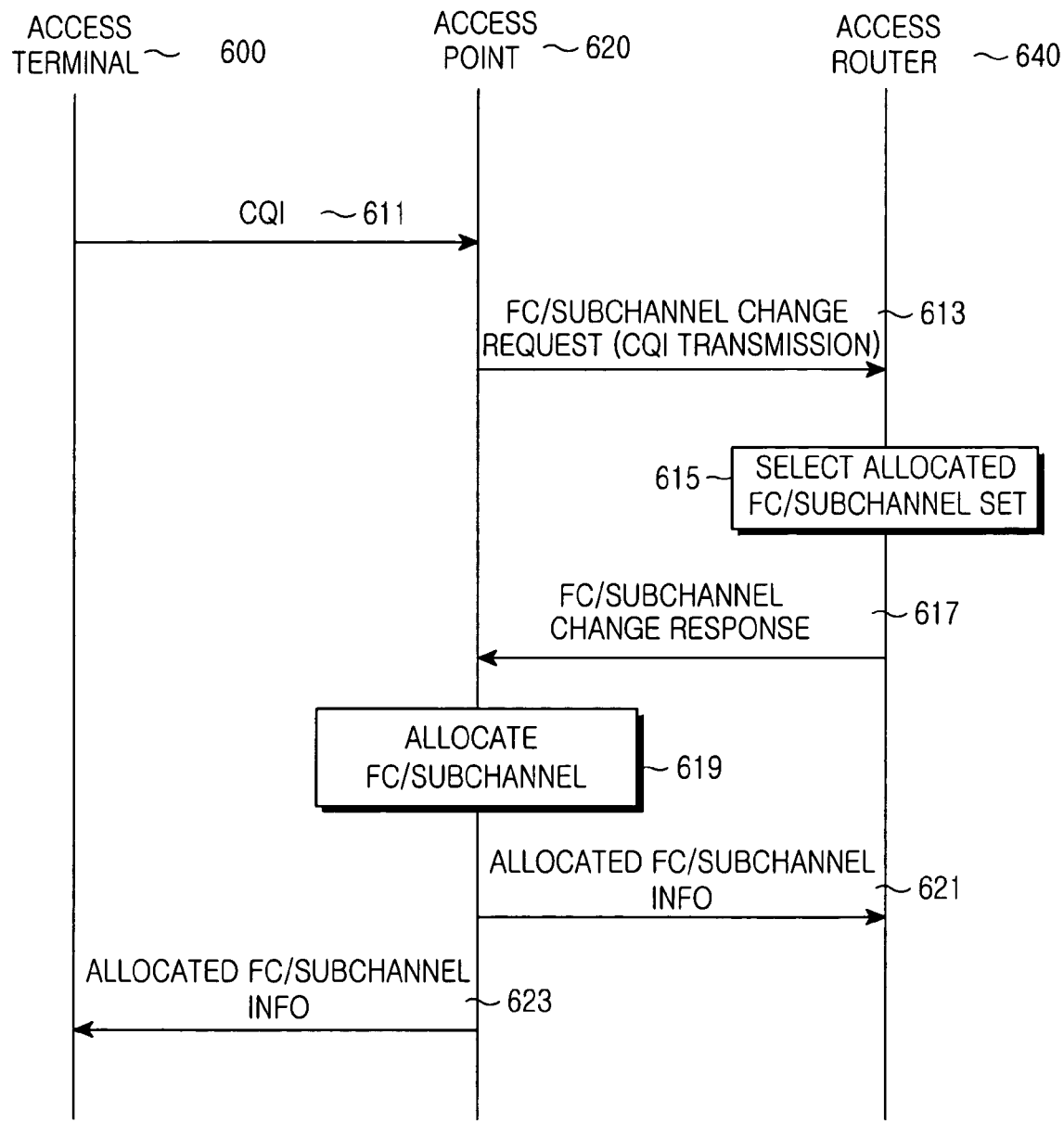
FIG. 6 is a signaling diagram illustrating a dynamic channel allocation process in an FH-OFCDMA communication system according to an embodiment of the present invention.

FIG. 6 is a signaling diagram illustrating a dynamic channel allocation process in an FH-OFCDMA communication system according to an embodiment of the present invention. Referring to FIG. 6, an access terminal 600 transmits CQI to its access point 620 on an FC-by-FC basis during a predetermined CQI transmission period (in step 611). The access point 620 analyzes the FC-based CQI received from the access terminal 600, and sends to an access router 640 a request for reallocating or changing the FC/subchannel for the access terminal 600 when the channel quality of the FC/subchannel currently allocated to the access terminal 600 deteriorates (in step 613). A method for determining, by the access point 620, access terminals whose current FC/subchannel must be changed from among a plurality of access terminals being serviced by the access point 620 will be described below. Although it is shown in FIG. 6 that an FC/subchannel change request is transmitted from only one access terminal, i.e. the access terminal 600, FC/subchannel change requests are actually transmitted from a plurality of access terminals as described above.

The access router 640 receiving an FC/subchannel change request for a plurality of access terminals from the access point 620 selects an FC/subchannel set to be allocated to the access terminals (in step 615). A detailed operation of selecting, by the access router 640, an FC/subchannel set to be allocated to a plurality of access terminals considering the access terminals corresponding to the FC/subchannel change request (or the access terminals for which FC/subchannel change request was received from the access point 620) will be described below.

The access router 640 transmits an FC/subchannel change response signal to the access point 620 together with information related to the FC/subchannel set allocated to the access terminals (in step 617). The access point 620 receiving the FC/subchannel change response from the access router 640 detects the FC/subchannel set information included in the FC/subchannel change response, selects the best FC/subchannel from among FCs/subchannels corresponding to the FC/subchannel set information based on the FC-based CQI last received from the access terminal 600, and allocates the selected best FC/subchannel to the access terminal 600 (in step 619). An operation for determining, by the access point 620, FC/subchannel while taking into consideration a plurality of access terminals will be described below. The access point 620 transmits to the access router 640 the information related to the FC/subchannel allocated to the access terminal 600 (Step 621), and also transmits the information to the access terminal 600 (in step 623).

A method for allocating by an access router an FC/subchannel set to a particular access terminal considering a plurality of access terminals corresponding to the FC/subchannel change request as described in connection with FIG. 6 is divided into 3 methods. A first method allocates an FC/subchannel set according to the order of the FC/subchannel change request, a second method allocates an FC/subchannel set according to the quality-of-service (QoS) level, and a third method allocates an FC/subchannel set such that a minimum bandwidth based on the QoS is maintained.

The operations of an access point and an access router according to the 3 methods will now be described considering.

Figure 7:
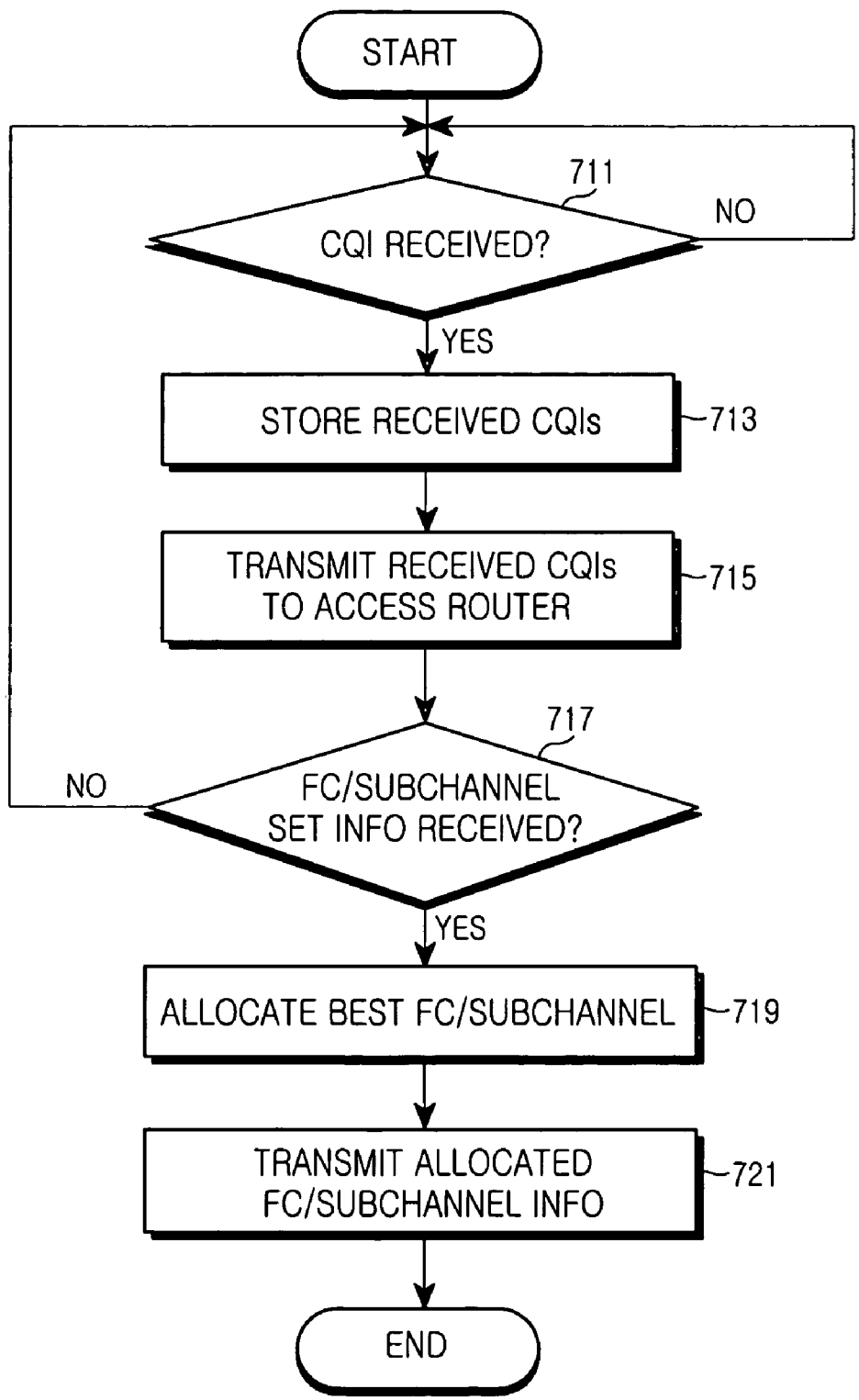
FIG. 7 is a flowchart illustrating an operation of an access point according to an embodiment of the present invention.

FIG. 7 is a flowchart illustrating an operation of an access point according to an embodiment of the present invention. Before a description of FIG. 7 is given, it should be noted that the 3 aforementioned methods are performed in an access router, and an access point allocates an FC/subchannel to an access terminal no matter which of the 3 methods the access router uses in selecting an FC/subchannel set. Therefore, the operation of an access point described with reference to FIG. 7 is equally applied no matter which of the 3 methods the access router uses in selecting an FC/subchannel set.

Referring to FIG. 7, in step 711, an access point determines during every frame if CQIs are received from the access terminals. If it is determined that CQIs are received, the access point proceeds to step 713. In step 713, the access point stores the CQIs received from the access terminals, and then proceeds to step 715. In step 715, the access point transmits the CQIs received from the access terminals to its access router, and then proceeds to step 717. The access point can transmit to the access router the CQIs received from all of the access terminals, or can transmit to the access router only the CQIs received from the access terminals having bad channel states for FCs/subchannels currently allocated thereto. In the case where the access point transmits to the access router the CQIs received from all of the access terminals, the access router determines if CQIs for the FCs/subchannels currently allocated to all the access terminals represent bad channel states, and allows the access point to perform an FC/subchannel reallocation or change operation only on the access terminals having bad channel states as a result of the determination.

In the case where the access point transmits to the access router the CQIs received only from the access terminals having bad channel states for FCs/subchannels currently allocated thereto, the access router allows the access point to perform an FC/subchannel change operation on the corresponding access terminals. For convenience, it will be assumed in FIG. 7 that the access point transmits to the access router only the CQIs received from the access terminals having bad channel states for FCs/subchannels currently allocated thereto. According to the assumption, transmitting CQIs from the access point to the access terminals is equivalent to requesting that the access terminals to change their current FCs/subchannels. The access point transmits the FC/subchannel change request to the access router together with information required for the method supported by the access router, and a detailed description thereof will be made herein below.

In step 717, the access point determines if information related to an FC/subchannel set reallocated to the access terminals that requested change of the currently allocated FCs/subchannels is received from the access router as the access terminals transmit CQIs. If it is determined that the information on an FC/subchannel set allocated to the access terminals that requested change of the FCs/subchannels is received from the access router, the access point proceeds to step 719. In step 719, the access point allocates the best FCs/subchannels from among the FCs/subchannels corresponding to the FC/subchannel set information received from the access router based on CQIs last received from the access terminals that requested a change of the FCs/subchannels, and then proceeds to step 721. Here, the best FCs/subchannels from among the FCs/subchannels corresponding to the FC/subchannel set information received from the access router correspond to FCs/subchannels for which the last received CQIs represent good channel states. For example, if FCs corresponding to the FC/subchannel set information received from the access router are defined as FC1 and FC2, and FCs are ordered in the sequence of FC4, FC3, FC2 and FC1 as a result of ordering CQIs last received from the access terminal by the access point in order of descending channel states, then the access point allocates FC2 to the access terminal as FC.

In step 721, the access point transmits to the access router the information related to the FCs/subchannels allocated to the respective access terminals so that the access router can recognize the allocated FCs/subchannels.

Next, with reference to FIG. 8, a description will be made of a process of allocating an FC/subchannel set by an access router according to the order of FC/subchannel change request.

Figure 8:
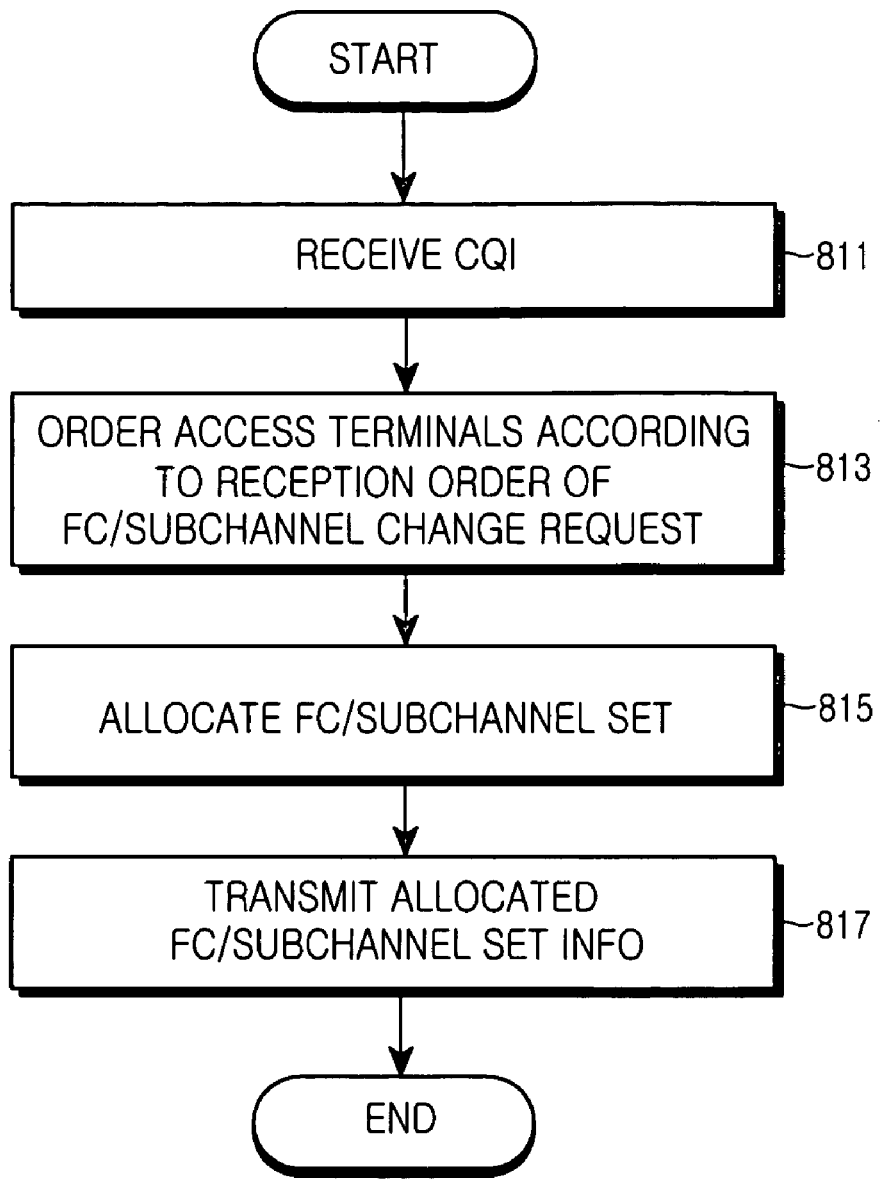
FIG. 8 is a flowchart illustrating an operation of an access router according to a first embodiment of the present invention.

FIG. 8 is a flowchart illustrating an operation of an access router according to an embodiment of the present invention. Before a description of FIG. 8 is given, it should be noted that in this embodiment of the present invention, the access router allocates an FC/subchannel set according to the order of FC/subchannel change request. That is, the access router allocates an FC/subchannel set according to the order of FC/subchannel change request for the access terminals received from the access point regardless of the QoSs of the data transmitted and received to/from the access terminals. In this case, the access router allocates the FC/subchannel set only to the access terminals corresponding to an FC/subchannel change request received from the access point. Table 1 illustrates information transmitted by the access point to the access router to send an FC/subchannel change request of an access terminal.

TABLE 1

| Parameter | Contents |
| --- | --- |
| AT ID | Identifier of access terminal |
| FC_Num | Total number of FCs |
| Subchannel_Num | The number of subchannels in each of all FCs |
| for (i=0; i<FC_Num; i++) | |
| { | |
| State | CQI of each FC (good, normal, bad) |
| } | |

Referring to FIG. 8, in step 811, an access router receives CQIs for the access terminals corresponding to an FC/subchannel change request from an access point, and then proceeds to step 813. In step 813, the access router orders (or arranges) the access terminals corresponding to the FC/subchannel change request in the reception order of their CQIs, i.e. in the order of the FC/subchannel change request, and then proceeds to step 815.

In step 815, the access router allocates to the access terminals a number of FCs/subchannels having a good or normal state from among the FCs/subchannels available in the FH-OFCDMA communication system in the arranged order as an FC/subchannel set, and then proceeds to step 817. The access point can maximize the FC resources of the system by selecting the subchannels in an FC having a relatively low load, i.e. an FC with a small number of subchannels currently allocated. If FC/subchannel to be allocated to a particular access terminal as an FC/subchannel set is already used by another access terminal, it cannot be allocated as an FC/subchannel set for the particular access terminal. In addition, if it is not possible to perform an FC/subchannel change operation on the access terminal requesting the change of an FC/subchannel, the access router forwards FC/subchannel information currently used by the access terminal to the access point to inform it that it should use the FC/subchannel information currently used by the access terminal. In step 817, the access router transmits to the access point the information related to the FCs/subchannels allocated to the access terminals, and then ends the operation.

Figure 9:
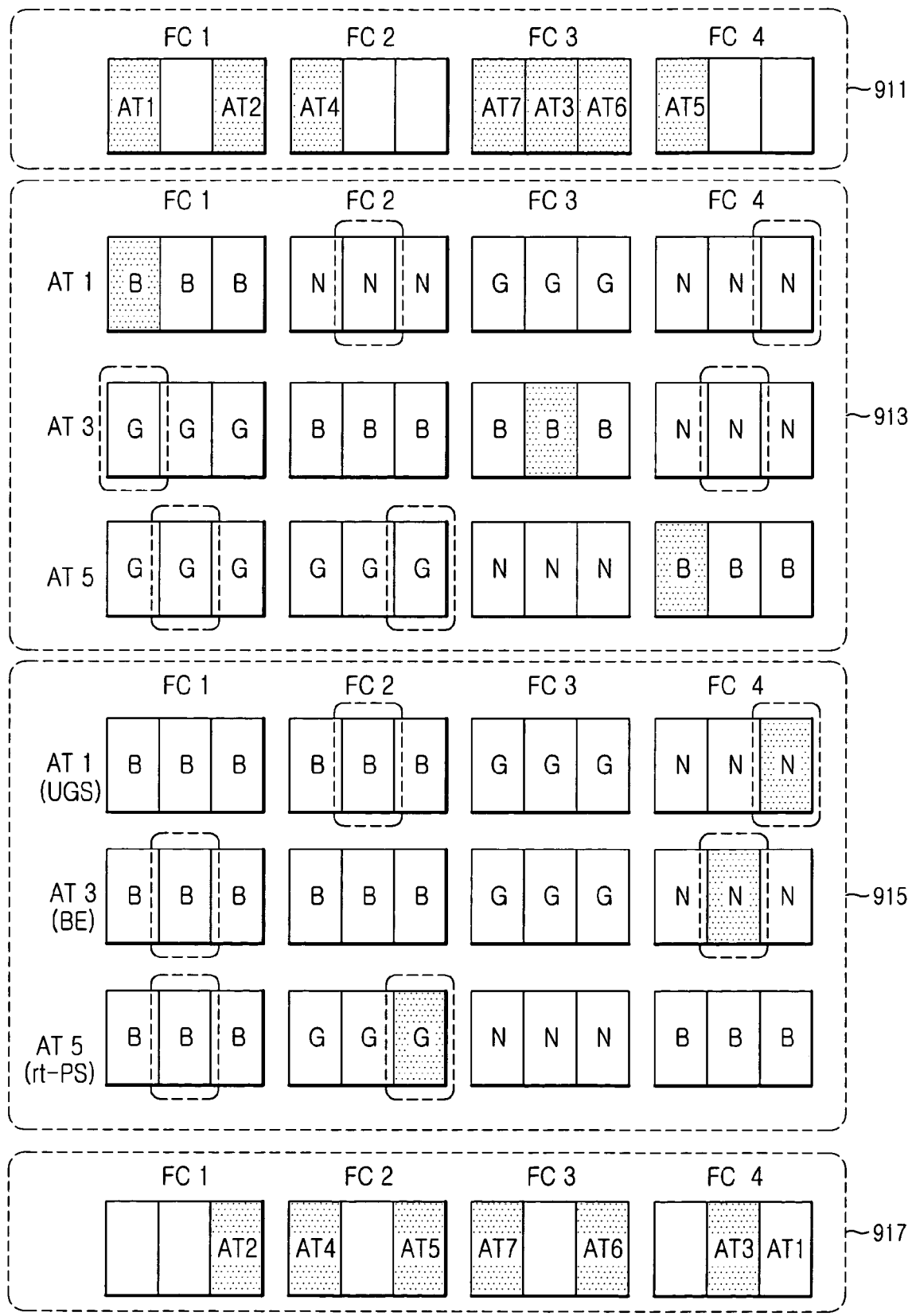
FIG. 9 is a diagram illustrating an example of allocating an FC/subchannel set based on the operation of an access router described with reference to FIG. 8.

FIG. 9 is a diagram illustrating an example of allocating an FC/subchannel set according to the order of the FC/subchannel change request based on the operation of an access router described with reference to FIG. 8. Before a description of FIG. 9 is given, it will be assumed that the number of access terminals allocated FCs/subchannels from an access point is 7 and the number of FCs provided from the access point is 4. For convenience, the 7 access terminals will be referred to as AT1 to AT7, and the 4 FCs will be referred to as FC1 to FC4. Further, in classifying the QoS levels, 'Best Effort' will be referred to as 'BE', 'Real Time Service' will be referred to as 'rt-PS', 'Non Real Time Service' will be referred to as 'nrt-PS, and 'Unsolicited Guaranteed Service' will be referred to as 'UGS'. The QoS levels are arranged in the order of UGS, rt-PS, nrt-PS and BE according to priority.

Referring to FIG. 9, in an $i^{th}$ frame, AT1 and AT2 are allocated subchannels of FC1, AT4 is allocated a subchannel of FC2, AT7, AT3 and AT6 are allocated subchannels of FC3, and AT5 is allocated a subchannel of FC4, as shown at 911 of FIG. 9.

Assume that due to a change in channel states, channel states of FCs/subchannels used by the AT1, AT3 and AT5 deteriorate, i.e. FCs/subchannels used by the AT1, AT3 and AT5 have bad channel states. In this case, the access point transmits an FC/subchannel change request to the access router for the AT1, AT3 and AT5. Here, the access point determines the channel states of the AT1 to AT7 using CQIs that the AT1 to AT7 periodically transmit.

The access router performs an FC/subchannel change operation as illustrated in 913 of FIG. 9 on the AT1, AT3 and AT5 upon receiving the FC/subchannel change request for the AT1, AT3 and AT5 from the access point. That is, the access router must allocate subchannels in a good FC, or FC3, to the AT1 based on the FC-based CQI for the AT1. However, because all of the other ATs use subchannels of the FC3, the access router allocates a subchannel #2 from among idle subchannels of a normal FC having a second-best channel state, or FC2, and a subchannel #3 from among idle subchannels of FC4, also a normal FC, as an FC/subchannel set. It is assumed in FIG. 9 that the number of FCs/subchannels included in an FC/subchannel set is 2. Further, the access router allocates a subchannel #1 from among idle subchannels in a good FC, or FC1, and a subchannel #2 from among idle subchannels in a normal FC, or FC4, to the AT3 as an FC/subchannel set. Here, although the subchannel #1 of FC1 is currently allocated to the AT1, because it is released by the FC/subchannel change request, it can be used. In addition, the access router allocates a subchannel #2 from among idle subchannels in a good FC, or FC1, and a subchannel #3 from among idle subchannels in FC2 to the AT3 as an FC/subchannel set based on FC-based CQI for the AT5.

The access router transmits information on the FC/subchannel set allocated for the AT1, AT3 and AT5 to the access point. Then in 915 of FIG. 9 the access point compares channel states of FCs corresponding to the FC/subchannel set information for the AT1, AT3 and AT5, received from the access router, with last received CQIs for the AT1, AT3 and AT5, to thereby allocate the best FCs/subchannels. Thus, as shown in 917 of FIG. 9, in an $(i+1)^{th}$ frame, AT2 is allocated a subchannel of FC1, AT4 and AT5 are allocated subchannels of FC2, AT7 and AT6 are allocated subchannels of FC3, and AT3 and AT1 are allocated subchannels of FC4.

Next, with reference to FIG. 10, a description will be made of a process of allocating an FC/subchannel set according to QoS level by an access router.

Figure 10:
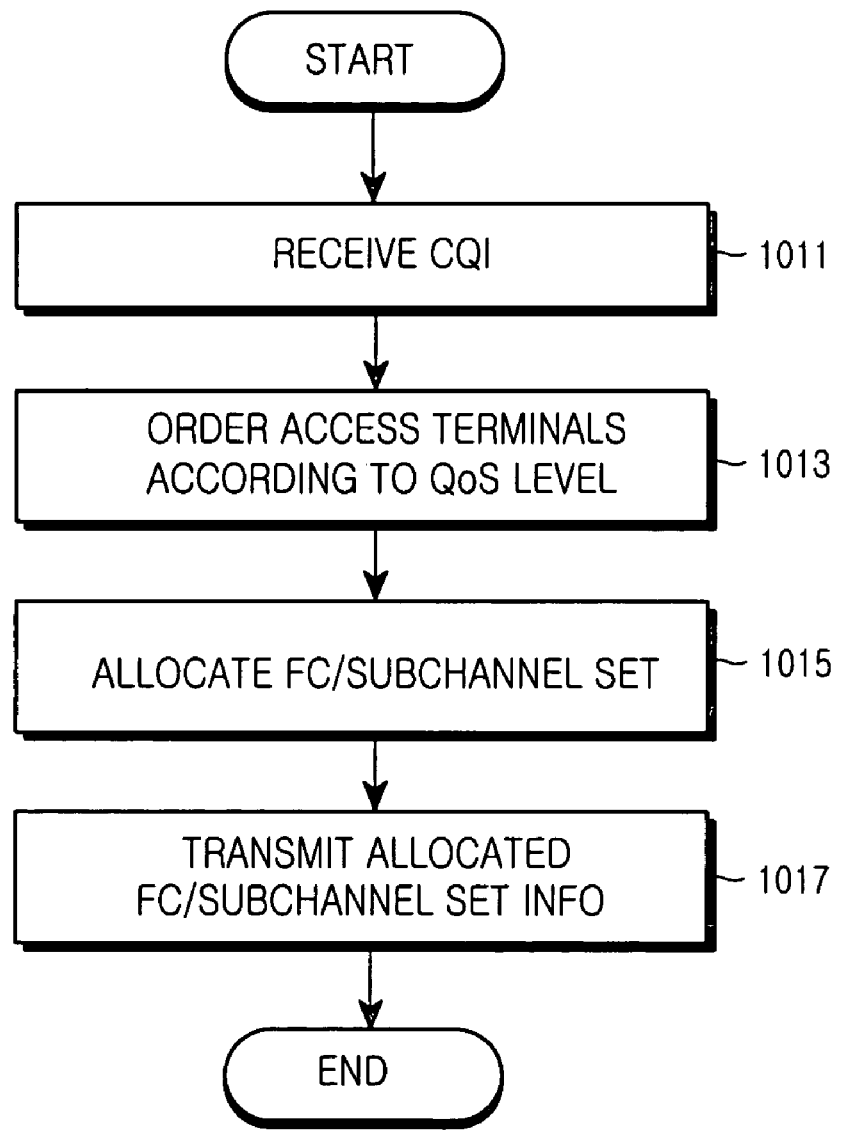
FIG. 10 is a flowchart illustrating an operation of an access router according to a second embodiment of the present invention.

FIG. 10 is a flowchart illustrating an operation of an access router according to another embodiment of the present invention. Before a description of FIG. 10 is given, it should be noted that in this embodiment of the present invention, the access router allocates an FC/subchannel set to the access terminals corresponding to an FC/subchannel change request from an access point according to the QoS level. That is, the access router allocates an FC/subchannel set according to the QoS level of the data transmitted and received to/from the access terminals corresponding to the FC/subchannel change request. In this case, the access router allocates the FC/subchannel set to the access terminals that correspond to an FC/subchannel change request received from the access point, and the access terminals whose FCs/subchannels were deprived by an access terminal having a high QoS level, due to their low QoS level. Table 2 illustrates information transmitted by the access point to the access router to send an FC/subchannel change request of an access terminal.

TABLE 2

| Parameter | Contents |
| --- | --- |
| AT ID | Identifier of access terminal |
| Priority | QoS level (service type) (UGS, Real Time Service, Non Real Time Service, Best Effort Service) |
| FC_Num | Total number of FCs |
| Subchannel_Num | The number of subchannels in each of all FCs |
| for (i=0; I<FC_Num; i++) { | |
| State | CQI of each FC (good, normal, bad) |
| } | |

A description of the QoS levels is given in Table 3.

TABLE 3

| QoS | Description |
|---|---|
| UGS (Unsolicited Guaranteed Service) | This is such a service as a VoIP service in which the same bandwidth should be continuously allocated while connection is maintained. This is a kind of a real-time service, and corresponds to a voice transmission service. |
| Real Time Service | This has a real-time service characteristic like UGS. However, because a size of generated data is variable every frame, an allocated bandwidth is variable. This corresponds to an image transmission service. |
| Non Real Time Service | This is a data service not having a real-time characteristic, and does not have a bursty characteristic like Best Effort Service. This service corresponds to FTP (File Transfer Protocol). |
| Best Effort Service | This is a service having a bursty characteristic, and corresponds to a Web service. This service is a lowest-class service and supports non-guaranteed bandwidth allocation, and a bandwidth is allocated in response to every request. |

In order to support this embodiment of the present invention, the QoS level must be included in the information transmitted from the access point to the access router to send an FC/subchannel change request of an access terminal as illustrated in Table 2.

Referring to FIG. 10, in step 1011, an access router receives CQIs for the access terminals corresponding to an FC/subchannel change request from an access point, and then proceeds to step 1013. In step 1013, the access router orders (or arranges) the access terminals according to the FC/subchannel change request in order of their QoS level, and then proceeds to step 1015. In this embodiment of the present invention, the access terminals corresponding to the FC/subchannel change request correspond to access terminals whose actual channel states are bad, and access terminals whose FCs/subchannels allocated to access terminals with a high QoS level are deprived due to their low QoS level. In step 1015, the access router allocates to the access terminals a number of FCs/subchannels having a good or normal channel state from among FCs/subchannels available for the FH-OFCDMA communication system in the arranged order as an FC/subchannel set, and then proceeds to step 1017. Here, the access point can maximize the FC resources of the system by selecting the subchannels in an FC having a relatively low load, i.e. an FC with a small number of subchannels currently allocated, in addition to the above condition described with reference to FIG. 8.

If an FC/subchannel to be allocated to a particular access terminal as an FC/subchannel set is already used by another access terminal as described with reference to FIG. 8, the access router applies a fundamental principle that the FC/subchannel cannot be allocated in an FC/subchannel set for the particular access terminal. However, the access point allocates an FC/subchannel set to an access terminal having a high QoS level without applying the fundamental principle to the access terminal having a high QoS level. In addition, if it is not possible to perform an FC/subchannel change operation on the access terminal requesting a change of an FC/subchannel, the access router forwards FC/subchannel information currently used by the access terminal to the access point to inform it that it should use the FC/subchannel information currently used by the access terminal. In step 1017, the access router transmits the information related to the FCs/subchannels allocated to the access terminals to the access point, and then ends the operation.

Figure 11:
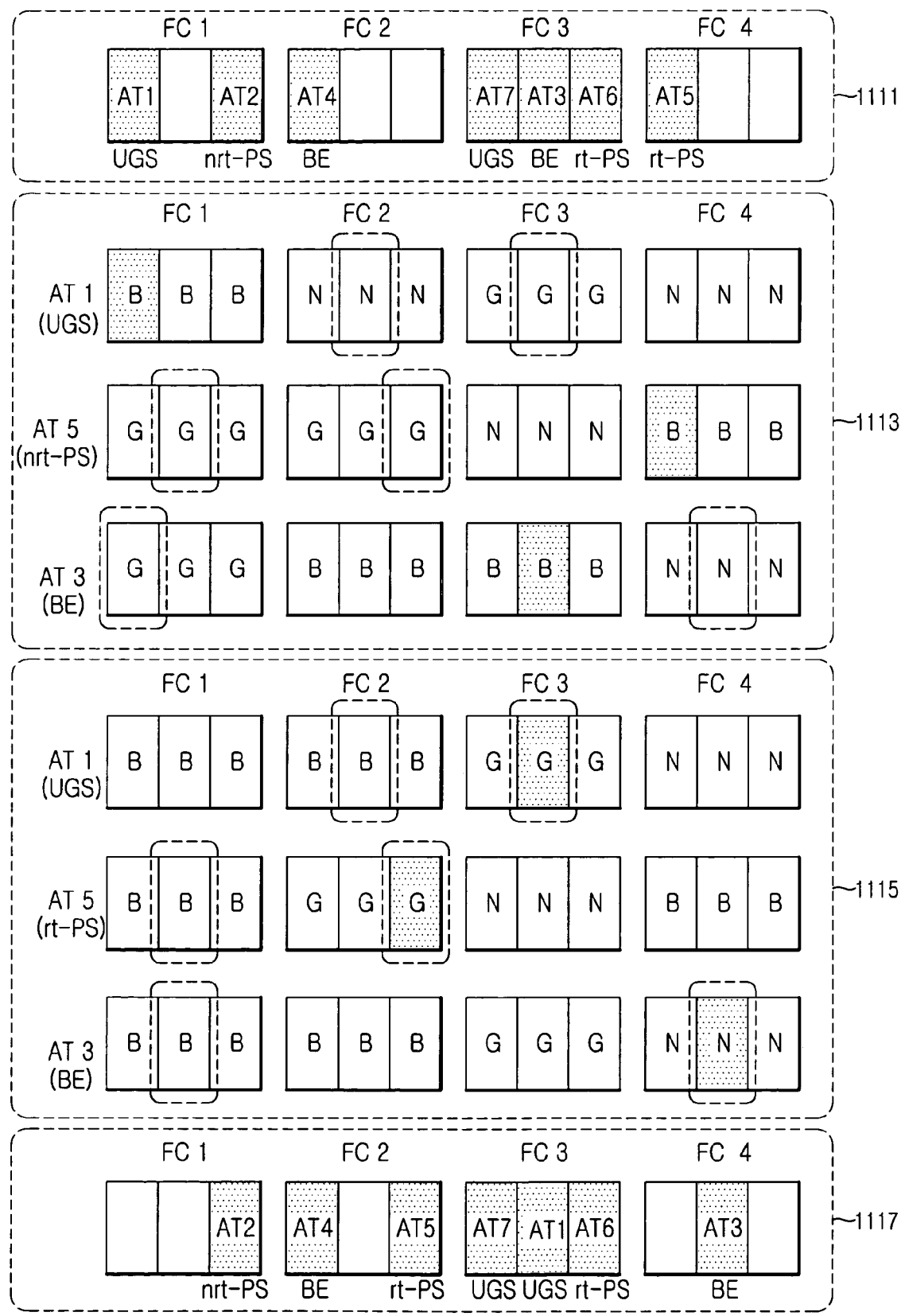
FIG. 11 is a diagram illustrating an example of allocating an FC/subchannel set based on the operation of an access router described with reference to FIG. 10.

FIG. 11 is a diagram illustrating an example of allocating an FC/subchannel set according to the QoS level based on the operation of an access router described with reference to FIG. 10. Before a description of FIG. 11 is given, it will be assumed that the number of access terminals allocated FCs/subchannels from an access point is 7 and the number of FCs provided from the access point is 4. For convenience, the 7 access terminals will be referred to as AT1 to AT7, and the 4 FCs will be referred to as FC1 to FC4. Table 4 illustrates priorities of the AT1 to AT7 according to the QoS level.

TABLE 4

| | AT1 | AT2 | AT3 | AT4 | AT5 | AT6 | AT7 |
|---|---|---|---|---|---|---|---|
| QoS level | UGS | Non Real Time Service | Best Effort | Best Effort | Real Time Service | Real Time Service | UGS |

Referring to FIG. 11, and as shown in 1111, in an $i^{th}$ frame, AT1 and AT2 are allocated subchannels of FC1, AT4 is allocated a subchannel of FC2, AT7, AT3 and AT6 are allocated subchannels of FC3, and AT5 is allocated a subchannel of FC4.

Assume that due to a change in channel states, channel states of FCs/subchannels used by the AT1, AT3 and AT5 are deteriorated, i.e. FCs/subchannels used by the AT1, AT3 and AT5 have bad channel states. In this case, the access point transmits an FC/subchannel change request to the access router for the AT1, AT3 and AT5. Here, the access point determines the channel states of the AT1 to AT7 using CQIs that the AT1 to AT7 periodically transmit.

The access router performs an FC/subchannel change operation on the AT1, AT3 and AT5 upon receiving the FC/subchannel change request for the AT1, AT3 and AT5 from the access point. That is, the access router allocates FCs/subchannels to the AT1, AT3 and AT5 based on FC-based CQI, and as illustrated Table 5, the access router can allocate even the FCs/subchannels already allocated to the ATs having a lower QoS level than the AT1, AT3 and AT5, to the AT1, AT3 and AT5.

TABLE 5

| | AT1 | AT7 | AT5 | AT6 | AT2 | AT3 | AT4 |
|---|---|---|---|---|---|---|---|
| QoS level | UGS | UGS | Real Time Service | Real Time Service | Non Real Time Service | Best Effort | Best Effort |

Referring to Table 5, and as shown in 1113, 1115 and 1117 of FIG. 11, in the case of AT1, a good FC is FC3 and all subchannels of FC3 are already used for other ATs, i.e. AT3, AT6 and AT7. However, because the AT1 has the highest priority as compared with all of the other ATs in the access point, the access router takes an FC/subchannel from AT3 having lowest priority from among ATs using subchannels in the FC3 and allocates the FC/subchannel to the AT1. As described with reference to FIG. 9, because an FC/subchannel set is comprised of two FCs/subchannels, the access router randomly selects FC2 from FC2 and FC4 having good channel states next to the channel state of the FC3, selects one particular subchannel from among idle subchannels in the FC2, i.e. selects two subchannels, and allocates the selected subchannels as the FC/subchannel set. As a result, in case of the AT1, the FC/subchannel set allocated from the access router includes FC2/subchannel2 and FC3/subchannel2. In the same manner, the AT3 and AT5 are also allocated FC1/subchannel1, FC4/subchannel2, FC1/subchannel2 and FC2/subchannel3 as an FC/subchannel set.

Next, with reference to FIG. 12, a description will be made of a process of allocating by an access router an FC/subchannel set according to a minimum bandwidth based on the QoS level.

Figure 12:
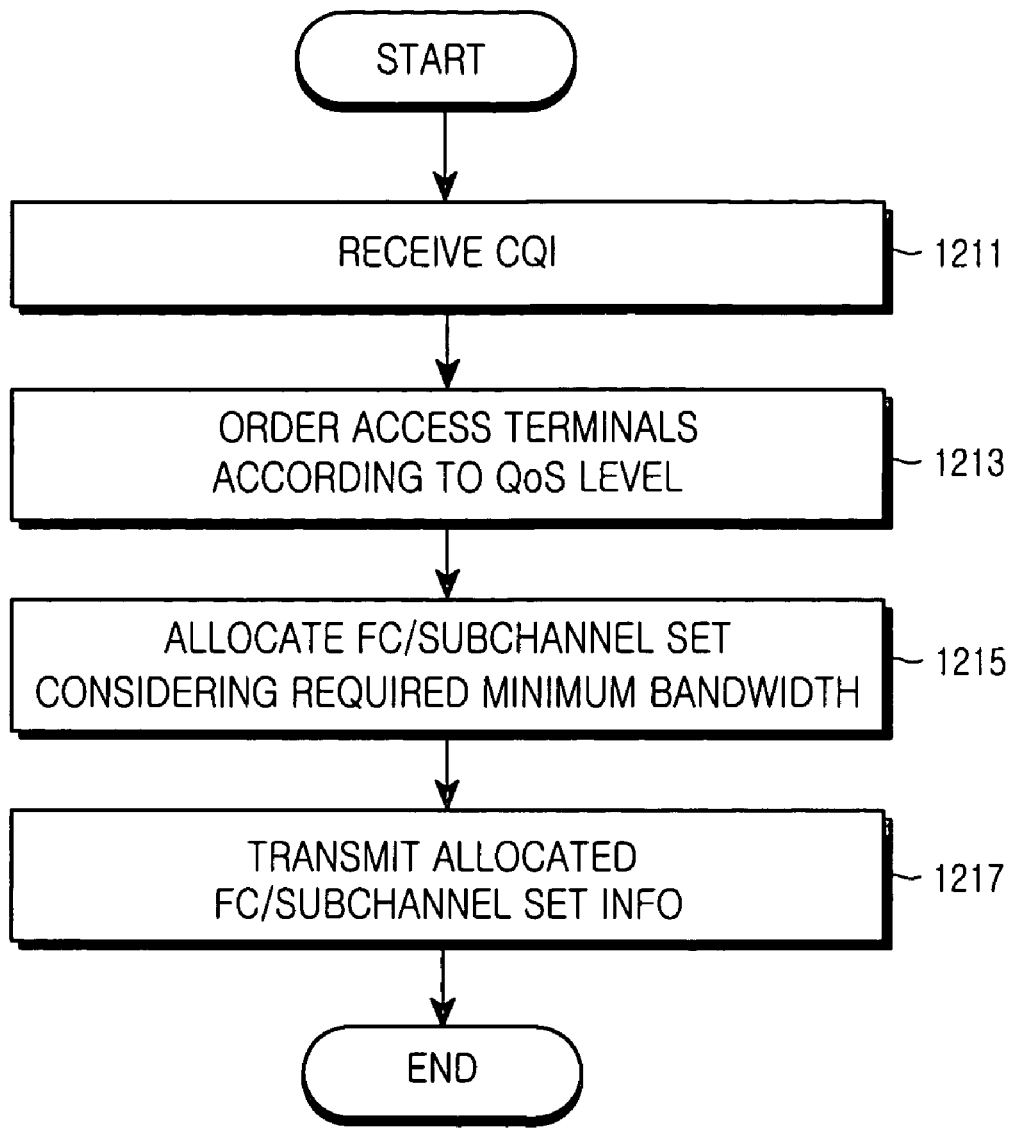
FIG. 12 is a flowchart illustrating an operation of an access router according to a third embodiment of the present invention.

FIG. 12 is a flowchart illustrating an operation of an access router according to another embodiment of the present invention. Before a description of FIG. 12 is given, it should be noted that in this embodiment of the present invention, the access router allocates an FC/subchannel set according to a minimum bandwidth based on the QoS level. That is, the access router allocates an FC/subchannel set to the access terminals corresponding to the FC/subchannel change request according to a minimum bandwidth based on the QoS level. In this case, the access router allocates the FC/subchannel set to the access terminals corresponding to an FC/subchannel change request received from the access point, and the access terminals whose FCs/subchannels were deprived by an access terminal having a high QoS level.

Specifically, in the case where an FC/subchannel set is allocated by taking into consideration the QoS levels of the access terminals, when the FH-OFCDMA communication system is overloaded, an access terminal having a lower priority cannot be allocated the FC/subchannel set. In addition, because there is a possible service that must maintain a minimum bandwidth according to the QoS level, it is necessary to allocate an FC/subchannel to an access terminal with a high QoS level while maintaining minimum FC/subchannel allocation for maintaining the minimum bandwidth based on the QoS level. In this case also, if there are not enough FCs/subchannels to be allocated to an access terminal requesting a change of an FC/subchannel, or an FC/subchannel having a good channel state is used by an access terminal having a low priority, the corresponding access terminal must be allocated the FC/subchannel used by the access terminal having a low priority. However, in this case also, a condition for allocating a minimum bandwidth of the access terminal having a low priority must be satisfied.

Table 6 illustrates information transmitted from the access point to the access router to send an FC/subchannel change request of an access terminal.

TABLE 6

| Parameter | Contents |
| --- | --- |
| AT ID | Identifier of access terminal |
| Priority | QoS level (service type) (UGS, Real Time Service, Non Real Time Service, Best Effort Service) |
| Min Subchannel_Num | Minimum bandwidth (the number of FCs/subchannels for maintaining minimum bandwidth) |
| FC_Num | Total number of FCs |
| Subchannel_Num for (i=0; i<FC_Num; i++) { | The number of subchannels in each of all FCs |
| State } | CQI of each FC (good, normal, bad) |

Referring to FIG. 12, in step 1211, an access router receives CQIs for access terminals corresponding to an FC/subchannel change request from an access point, and then proceeds to step 1213. In step 1213, the access router orders (or arranges) the access terminals according to the FC/subchannel change request in order of their QoS level, and then proceeds to step 1215. In this embodiment of the present invention, the access terminals corresponding to the FC/subchannel change request are the access terminals whose actual channel states are bad, and access terminals whose FCs/subchannels allocated to access terminals with a high QoS level are deprived of system resources due to their low QoS level. In step 1215, the access router allocates to the access terminals a number of FCs/subchannels having a good or normal channel state from among the FCs/subchannels available for the FH-OFCDMA communication system in the arranged order as an FC/subchannel set while taking into consideration a required minimum bandwidth, and then proceeds to step 1217.

Here, the access point can maximize the FC resources of the system by selecting that the subchannels in an FC having a relatively low load, i.e. an FC with a small number of subchannels currently allocated, in addition to the above condition as described with reference to FIGS. 8 and 10. If the FC/subchannel to be allocated to a particular access terminal as an FC/subchannel set is already used by another access terminal as described with reference to FIG. 8, the access router applies a fundamental principle that the FC/subchannel cannot be allocated as an FC/subchannel set for the particular access terminal. However, the access point allocates an FC/subchannel set to an access terminal having a high QoS level without applying the fundamental principle to the access terminal having a high QoS level.

However, this embodiment of the present invention, unlike the previously described embodiment of the present invention, must allocate FCs/subchannels such that even an access terminal having a lower priority can maintain a minimum bandwidth for providing a service. In addition, if it is not possible to perform an FC/subchannel change operation on the access terminal requesting a change of an FC/subchannel, the access router forwards the FC/subchannel information currently used by the access terminal to the access point to inform it that it should use the FC/subchannel information currently used by the access terminal. In step 1217, the access router transmits to the access point the information related to the FCs/subchannels allocated to the access terminals, and then ends the operation.

Figure 13:
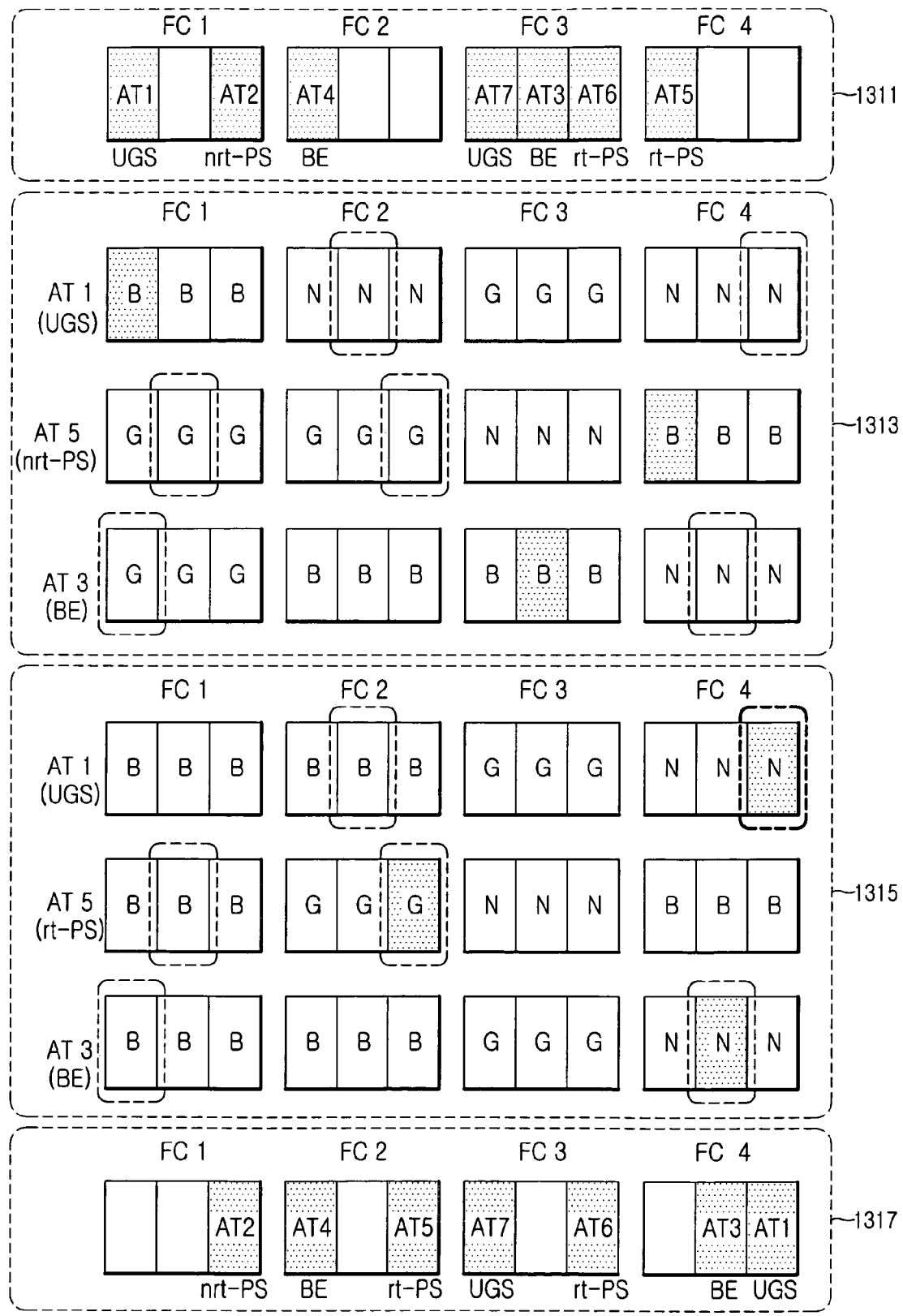
FIG. 13 is a diagram illustrating an example of allocating an FC/subchannel set based on the operation of an access router described with reference to FIG. 12.

FIG. 13 is a diagram illustrating an example of allocating an FC/subchannel set according to a QoS level-based minimum bandwidth based on the operation of an access router described with reference to FIG. 12. Before a description of FIG. 13 is given, it will be assumed that the number of access terminals allocated FCs/subchannels from an access point is 7 and the number of FCs provided from the access point is 4. For convenience, the 7 access terminals will be referred to as AT1 to AT7, and the 4 FCs will be referred to as FC1 to FC4. Table 7 illustrates priorities and minimum bandwidths (Min BW) of the AT1 to AT7 according to QoS level.

TABLE 7

|  | AT1 | AT2 | AT3 | AT4 | AT5 | AT6 | AT7 |
| --- | --- | --- | --- | --- | --- | --- | --- |
| Priority | UGS | nrt-PS | BE | BE | rt-PS | rt-PS | UGS |
| Min BW | 1 | 1 | 1 | 0 | 0 | 1 | 0 |

Referring to FIG. 13, and as shown in 1311, in an $i^{th}$ frame, AT1 and AT2 are allocated subchannels of FC1, AT4 is allocated a subchannel of FC2, AT7, AT3 and AT6 are allocated subchannels of FC3, and AT5 is allocated a subchannel of FC4.

Assume that due to a change in channel states, channel states of FCs/subchannels used by the AT1, AT3 and AT5 deteriorate, i.e. FCs/subchannels used by the AT1, AT3 and AT5 have bad channel states. In this case, the access point transmits an FC/subchannel change request to the access router for the AT1, AT3 and AT5. Here, the access point determines the channel states of the AT1 to AT7 using CQIs that the AT1 to AT7 periodically transmit.

In order to change FCs/subchannels of the AT1, AT3 and AT5, the access router orders all of the access terminals being serviced by the access point according to priority. The priorities of the ordered access terminals are illustrated in Table 8.

TABLE 8

|  | AT1 | AT7 | AT5 | AT6 | AT2 | AT3 | AT4 |
|---|---|---|---|---|---|---|---|
| Priority | UGS | UGS | rt-PS | rt-PS | nrt-PS | BE | BE |
| Min BW | 1 | 1 | 0 | 1 | 1 | 1 | 0 |

Although the access router allocates an FC/subchannel according to the priority as illustrated in Table 8, the minimum bandwidth must be maintained even in this case.

In the case of AT1, and as shown in 1313 and 1315, a good FC is FC3 and all of the subchannels of FC3 are already used for other ATs. However, because the AT1 has a highest priority from among all of the other ATs in the access point, the access router should take FC/subchannel from AT3 having lowest priority from among the other ATs and allocate the FC/subchannel to the AT1. However, because all of the AT3, AT6 and AT7 allocated subchannels in the FC3 require one subchannel as a minimum bandwidth, the AT1 cannot be allocated a subchannel of FC3 no matter how high its priority is. Therefore, the access router should select FC2 and FC4 having a second-best channel state. As a result, in case of the AT1, the FC/subchannel set allocated from the access router includes FC2/subchannel2 and FC4/subchannel3. In the same manner, the AT3 and AT5 are also allocated FC1/subchannel1, FC4/subchannel2, FC1/subchannel2 and FC2/subchannel3 as an FC/subchannel set.

The access point allocates the final available FC/subchannel to the access terminal based on the latest CQI 1315 received from the access terminal and FC/subchannel allocation information 1313 received from the access router as shown in 1317. As a result, the AT1, AT3 and AT5 are reallocated FC4/subchannel4, FC4/subchannel2, and FC2/subchannel3, respectively.

As can be appreciated from the foregoing description, the present invention dynamically allocates channels by taking into consideration a QoS level, minimum bandwidth and channel quality in an OFDM mobile communication system, thereby maximizing resource efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for dynamically allocating a frame cell (FC)/subchannel in a mobile communication system that divides an entire frequency band into a plurality of sub-frequency bands and includes a plurality of FCs having a frequency domain and a time domain, occupied by a plurality of sub-channels each of which is a set of a number of sub-frequency bands, the method comprising the steps of:

receiving, by an access point, on an FC-by-FC basis, channel quality information (CQIs) fed back from a plurality of access terminals, and storing the CQIs according to a reception order of the CQIs;

transmitting, by the access point, an FC/subchannel change request including the stored CQIs at least one access terminal to an access router when FCs/subchannels currently in use by at least one access terminal need to be reallocated based on the CQIs;

allocating, by the access router, an FC/subchannel set by selecting a number of FCs/subchannels according to a predetermined method for the at least one access terminal after receiving the FC/subchannel channel change request, and transmitting information related to the allocated FC/subchannel set to the access point;

ordering, by the access router, the at least one access terminal according to the reception order of the CQIs in the received FC/subchannel change requests after receiving the FC/subchannel channel change request;

sequentially allocating, by the access router, a number of the FCs/subchannels as a FCs/subchannels set according to the ordering result;

transmitting information related to the allocated FCs/subchannels set to the access point; and selecting and allocating, by the access point, a particular FC/subchannel from among FCs/subchannels in the FC/subchannel set information received from the access router for the at least one access terminal based on CQIs last received from the at least one access terminal.

2. The method of claim 1, wherein the allocating step comprises the steps of:

if more than one access terminal requests a change, ordering the more than one access terminals according to the order of received FC/subchannel change requests; and sequentially allocating a number of the FCs/subchannels as the FC/subchannel set according to the ordering result.

3. The method of claim 1, wherein the transmitting step comprises the step of:

reallocating FCs/subchannels to access terminals having a channel quality less than a predetermined channel quality based on CQIs fed back from the access terminals.

4. A method for dynamically allocating a frame cell (FC)/subchannel in a mobile communication system that divides an entire frequency band into a plurality of sub-frequency bands and includes a plurality of FCs having a frequency domain and a time domain, occupied by a plurality of sub-channels each of which is a set of a number of sub-frequency bands, the method comprising the steps of:

receiving, by an access point, on an FC-by-FC basis, channel quality information (CQIs) fed back from a plurality of access terminals;

transmitting, by the access point, an FC/subchannel change request for at least one access terminal to an access router when FCs/subchannels currently used by the at least one access terminal need to be reallocated based on the CQIs;

ordering, by the access router, the at least one access terminal according to quality-of-service (QoS) levels of the at least one access terminal;

sequentially allocating, by the access router, a number of FCs/subchannels as the FC/subchannel set according to the ordering result;

transmitting information related to the allocated FC/subchannel set to the access point; and selecting and allocating, by the access point, a particular FC/subchannel from among FCs/subchannels in the FC/subchannel set information received from the access router for the at least one access terminal based on CQIs last received from the at least one access terminal.

5. The method of claim 4, wherein the allocating step comprises the step of:
if the FCs/subchannels to be reallocated are currently in use by an access terminal having a low priority, releasing the FCs/subchannels in use by the access terminal having a low priority; and
allocating the released FCs/subchannels to the access terminals having a high priority.

6. A method for dynamically allocating a frame cell (FC)/subchannel in a mobile communication system that divides an entire frequency band into a plurality of sub-frequency bands and includes a plurality of FCs having a frequency domain and a time domain, occupied by a plurality of sub-channels each of which is a set of a number of sub-frequency bands, the method comprising the steps of:
receiving, by an access point, on an FC-by-FC basis, channel quality information (CQIs) fed back from a plurality of access terminals;
transmitting, by the access point, an FC/subchannel change request for at least one access terminal to an access router when FCs/subchannels currently used by the at least one access terminal need to be reallocated based on the CQIs;
ordering the access terminals, the at least one access terminal according to a minimum bandwidth required for a QoS level of the at least one access terminals;
sequentially allocating a number of FCs/subchannels as the FCs/subchannels set according to the ordering result
transmitting information related to the allocated FC/subchannel set to the access point; and
selecting and allocating, by the access point, a particular FC/subchannel from among FCs/subchannels in the FC/subchannel set information received from the access router for the at least one access terminal based on CQIs last received from the at least one access terminal.

7. The method of claim 6, wherein the allocating step comprises the steps of:
if FCs/subchannels are in use by access terminals having a low priority, detecting a minimum bandwidth of the access terminals having a low priority;
releasing all FCs/subchannels except the FC/subchannel required to maintain the minimum bandwidth; and
allocating the released FCs/subchannels to access terminals having a high priority.

8. The method of claim 6, wherein the selecting step comprises the step of selecting a FC/subchannel having the best channel quality from among the FCs/subchannels in the FCs/subchannels set information based on CQIs last received from the at least one access terminal.

9. A system for dynamically allocating a frame cell (FC)/subchannel in a mobile communication system that divides an entire frequency band into a plurality of sub-frequency bands, and includes a plurality of FCs having a frequency domain and a time domain, occupied by a plurality of subchannels each of which is a set of a number of sub-frequency bands, the system comprising:
an access point for receiving channel quality information (CQIs) fed back from a plurality of access terminals on an FC-by-FC basis, determining a modulation and coding scheme (MCS) to be applied to each of the access terminals based on the CQIs, sending to an access router an FC/subchannel change request for at least one access terminal whose FCs/subchannels must be reallocated, and if information on an FC/subchannel set including a number of FCs/subchannels, generated according to a control signal of the access router in response to the FC/subchannel change request, selecting and allocating a FC/subchannel from among FCs/subchannels in the FC/subchannel set information for the at least one access terminal based on the CQIs last received from the access terminals whose FCs/subchannels must be changed; and
an access router for allocating an FC/subchannel set by selecting a number of FCs/subchannels corresponding to the FC/subchannel change request received from the access point, and transmitting information on the allocated FC/subchannel set to the access point.

10. The system of claim 9, wherein the access router orders the access terminals in reception order, and sequentially allocates a number of the FCs/subchannels according to the ordering result.

11. The system of claim 9, wherein the access router orders the access terminals according to a quality-of-service (QoS) level of the access terminals, and sequentially allocates a number of FCs/subchannels according to the ordering result.

12. The system of claim 11, further comprising the step of releasing FCs/subchannels of an access terminal having a low priority, and allocating the released FCs/subchannels to an access terminal having a high priority.

13. The system of claim 9, wherein the access router orders the access terminals according to a minimum bandwidth required for a QoS level, and sequentially allocates a number of FCs/subchannels according to the ordering result.

14. The system of claim 13, further comprising the step of releasing FCs/subchannels of an access terminal having a low priority by taking a requested minimum bandwidth into consideration and allocating the released FCs/subchannels to an access terminal having a high priority.

15. The system of claim 9, wherein the access point selects a FC/subchannel having the best channel quality from among FCs/subchannels in the FC/subchannel set information based on CQIs last received from the access terminals whose FCs/subchannels must be reallocated.

16. The system of claim 9, wherein FCs/subchannels are reallocated to access terminals having a channel quality less than a predetermined channel quality.

* * * * *